United States Patent
Harms

(10) Patent No.: US 10,233,121 B2
(45) Date of Patent: Mar. 19, 2019

(54) CERAMIC MATRIX COMPOSITIONS AND USES THEREOF

(71) Applicant: Aermist LLC, Las Vegas, NV (US)

(72) Inventor: Jonathan S. Harms, Las Vegas, NV (US)

(73) Assignee: NANO EVAPORATIVE TECHNOLOGIES, INC., Henderson, NV (US)

( * ) Notice: Subject to any disclaimer, the term of this patent is extended or adjusted under 35 U.S.C. 154(b) by 0 days.

(21) Appl. No.: 15/482,714

(22) Filed: Apr. 8, 2017

(65) Prior Publication Data

US 2017/0291853 A1    Oct. 12, 2017

Related U.S. Application Data

(60) Provisional application No. 62/320,429, filed on Apr. 8, 2016.

(51) Int. Cl.
| | |
|---|---|
| *C04B 24/26* | (2006.01) |
| *C04B 28/14* | (2006.01) |
| *C04B 103/67* | (2006.01) |
| *C04B 111/00* | (2006.01) |
| *C04B 111/72* | (2006.01) |

(52) U.S. Cl.
CPC .......... *C04B 28/14* (2013.01); *C04B 24/2623* (2013.01); *C04B 24/2652* (2013.01); *C04B 28/145* (2013.01); *C04B 2103/67* (2013.01); *C04B 2111/00146* (2013.01); *C04B 2111/00172* (2013.01); *C04B 2111/00482* (2013.01); *C04B 2111/00586* (2013.01); *C04B 2111/72* (2013.01)

(58) Field of Classification Search
CPC . C04B 28/14; C04B 24/2623; C04B 24/2652; C04B 2103/67; C04B 2111/00172; C04B 2111/72; C04B 28/145; C04B 2111/00146; C04B 2111/00482; C04B 2111/00586
See application file for complete search history.

(56) References Cited

U.S. PATENT DOCUMENTS 5,387,626 A * 2/1995 Bohme-Kovac ...... C04B 24/383
524/35

* cited by examiner

*Primary Examiner* — Patrick D Niland
(74) *Attorney, Agent, or Firm* — Entralta P.C.; Justin G. Sanders; Peter D. Weinstein

(57) ABSTRACT

The present specification discloses ceramic matrix compositions, methods of making such ceramic matrix compositions and methods and uses for such ceramic matrix compositions.

20 Claims, No Drawings

CERAMIC MATRIX COMPOSITIONS AND USES THEREOF

This application claims the benefit of priority and the filing date of U.S. Provisional Patent Application 62/320,429, filed on Apr. 8, 2016, the contents of which are hereby incorporated by reference in its entirety.

Ceramic materials are inorganic, non-metallic materials compounded from a metal and a non-metal. Solid and inert, known ceramic materials tend to be stiff, brittle, strong in compression, weak in shearing and tension, chemically inert, and non-conductors of heat and electricity, but their properties vary widely. Ceramic materials generally can withstand very high temperatures such as temperatures that range from 1,000° C. to 1,600° C. Traditional ceramic raw materials include clay minerals such as kaolinite, but modern ceramic materials, which are classified as advanced ceramics, include aluminum oxide, silicon carbide and tungsten carbide. Currently, many different ceramic materials are now used in domestic, industrial and building products.

Ceramic materials may be crystalline or partly crystalline and are formed by the action of heat and subsequent cooling. For example, crystalline ceramic materials can be made by either making the ceramic material in the desired shape by reaction or by forming the ceramic material in a desired shape and then sintering to form a solid body. Non-crystalline ceramics, being glasses, tend to be formed from melts. The glass is shaped when either fully molten, by casting, or when in a state of taffy-like viscosity, by methods such as blowing to a mold. If later heat-treatments cause this glass to become partly crystalline, the resulting material is known as a glass-ceramic.

Due to the requirement of heat action, the currently available ceramic materials are limited in the type of additional components that can be incorporated or otherwise embedded within the ceramic material. For example, components whose physical or functional attributes are heat-susceptible are currently not able to be incorporated or otherwise embedded within the ceramic material. As such, there is need to develop a ceramic material that can be produced without the action of heat.

SUMMARY

The present specification discloses a ceramic matrix material. The disclosed ceramic matrix material are produced without the action of heat, and as such, can incorporate or embed additional components that are heat-liable. In addition, the disclosed ceramic matrix material has a greater plasticity than currently available ceramic materials. The disclosed ceramic matrix material are useful for preparing thermo-storage components. These and other advantages are disclosed herein.

Aspects of the present specification disclose a ceramic matrix composition. The disclosed ceramic matrix composition can comprise a hydraulic gypsum cement material, a non-hydraulic gypsum cement material, a cross-linked synthetic hydrogel and a binder. The ceramic matrix composition disclosed herein comprises a three-dimensional interconnected array of channels.

Other aspects of the present specification disclose a method of making a ceramic matrix composition disclosed herein. The disclosed method comprises the steps of depositing a slurry mixture a hydraulic gypsum cement material, a non-hydraulic gypsum cement material, a cross-linked synthetic hydrogel, a binder, zinc and water and allowing the slurry mixture to set in order to form the ceramic matrix composition.

Other aspects of the present specification disclose a method of treating a surface of a pre-existing material using a ceramic matrix composition disclosed herein. The disclosed method comprises the steps of depositing a slurry mixture a hydraulic gypsum cement material, a non-hydraulic gypsum cement material, a cross-linked synthetic hydrogel, a binder, zinc and water onto a surface of a pre-existing material and allowing the slurry mixture to set.

DETAILED DESCRIPTION

The present specification discloses ceramic matrix compositions. The disclosed ceramic matrix compositions comprise materials that do not require the use of elevated temperatures to harden, set, chemically alter or dry the ceramic matrix compositions. The ability to cure, set and harden the ceramic matrix compositions at ambient temperature allows for the encapsulation or embedding of additional components that would otherwise be destroyed using a kiln or other fire casting procedure that employs elevated temperatures. In addition, the disclosed ceramic matrix compositions comprise its three-dimensional interconnected array of channels that create a porosity that enable a controlled absorption of a fluid into the ceramic matrix composition, controlled distribution of the fluid within the ceramic matrix composition, and evaporation of a fluid from the surface of the ceramic matrix composition. As such, the disclosed ceramic compositions are useful in producing articles of manufacture where heating or cooling of a gas or gas mixture improves performance.

A ceramic matrix composition is any inorganic crystalline or amorphous material compound of a metal and a non-metal. It is preferred that the metal comprises a metal oxide. Non-limiting examples of metal oxides include $Al_2O_3$, $SiO_2$, $ZrO$, $CeO_2$ and $TiO_2$.

A ceramic matrix composition disclosed herein has a three-dimensional interconnected array of channels. These channels are formed when a crosslinked synthetic hydrogel disclosed herein shrinks when the ceramic matrix composition dries during the setting process. Although a subset of channels may become isolated or entrapped (i.e., a void space), the majority of the channels form a three-dimensional interconnected array of channels which acts as a flow path for fluids that confer a porosity within the ceramic matrix composition.

During manufacture of a ceramic matrix composition disclosed herein, the slurry mixture is deposited into the mold so that less channel formation occurs at the outer surface of the final ceramic matrix composition. This procedure adds strength to the outer surface of the ceramic matrix composition making the final compositions more durable and less prone to breakage. The thickness of an outer surface of a ceramic matrix composition disclosed herein will depend on the size and shape of the form of the ceramic matrix composition. In aspects of this embodiment, a thickness of an outer surface of a ceramic matrix composition disclosed herein may be, e.g., about 1 mm, about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm or about 20 mm. In other aspects of this embodiment, a thickness of an outer surface of a ceramic matrix composition disclosed herein may be, e.g., at least 1 mm, at least 2 mm, at least 3 mm, at least 4 mm, at least 5 mm, at least 6 mm, at least 7 mm, at least 8 mm, at least 9 mm, at least 10 mm, at least 11 mm, at least 12 mm, at least 13 mm, at least 14 mm, at least 15 mm, at least 16 mm, at least 17 mm, at least 18 mm, at least 19 mm or at least 20 mm. In yet other aspects of this embodiment, a thickness of an outer surface of a ceramic matrix composition disclosed herein may be, e.g., at most 1 mm, at most 2 mm, at most 3 mm, at most 4 mm, at most 5 mm, at most 6 mm, at most 7 mm, at most 8 mm, at most 9 mm, at most 10 mm, at most 11 mm, at most 12 mm, at most 13 mm, at most 14 mm, at most 15 mm, at most 16 mm, at most 17 mm, at most 18 mm, at most 19 mm or at most 20 mm.

In other aspects of this embodiment, a thickness of an outer surface of a ceramic matrix composition disclosed herein may be, e.g., about 1 mm to about 5 mm, about 1 mm to about 10 mm, about 1 mm to about 15 mm, about 1 mm to about 20 mm, about 1 mm to about 25 mm, about 1 mm to about 30 mm, about 1 mm to about 35 mm, about 1 mm to about 40 mm, about 1 mm to about 45 mm, about 1 mm to about 50 mm, about 5 mm to about 10 mm, about 5 mm to about 15 mm, about 5 mm to about 20 mm, about 5 mm to about 25 mm, about 5 mm to about 30 mm, about 5 mm to about 35 mm, about 5 mm to about 40 mm, about 5 mm to about 45 mm, about 5 mm to about 50 mm, about 10 mm to about 15 mm, about 10 mm to about 20 mm, about 10 mm to about 25 mm, about 10 mm to about 30 mm, about 10 mm to about 35 mm, about 10 mm to about 40 mm, about 10 mm to about 45 mm, about 10 mm to about 50 mm, about 15 mm to about 20 mm, about 15 mm to about 25 mm, about 15 mm to about 30 mm, about 15 mm to about 35 mm, about 15 mm to about 40 mm, about 15 mm to about 45 mm, about 15 mm to about 50 mm, about 20 mm to about 25 mm, about 20 mm to about 30 mm, about 20 mm to about 35 mm, about 20 mm to about 40 mm, about 20 mm to about 45 mm, about 20 mm to about 50 mm, about 25 mm to about 30 mm, about 25 mm to about 35 mm, about 25 mm to about 40 mm, about 25 mm to about 45 mm, about 25 mm to about 50 mm, about 30 mm to about 35 mm, about 30 mm to about 40 mm, about 30 mm to about 45 mm, about 30 mm to about 50 mm, about 35 mm to about 40 mm, about 35 mm to about 45 mm, about 35 mm to about 50 mm, about 40 mm to about 45 mm, about 40 mm to about 50 mm or about 40 mm to about 50 mm.

In aspects of this embodiment, a ceramic matrix composition disclosed herein has, e.g. about 10% less, about 15% less, about 20% less, about 25% less, about 30% less, about 35% less, about 40% less, about 50% less, about 55% less, about 60% less, about 65% less, about 70% less or about 75% less channel formation on the outer surface of the ceramic matrix composition relative to the interior of the ceramic matrix composition. In other aspects of this embodiment, a ceramic matrix composition disclosed herein has, e.g., at least 10% less, at least 15% less, at least 20% less, at least 25% less, at least 30% less, at least 35% less, at least 40% less, at least 50% less, at least 55% less, at least 60% less, at least 65% less, at least 70% less or at least 75% less channel formation on the outer surface of the ceramic matrix composition relative to the interior of the ceramic matrix composition. In yet other aspects of this embodiment, a ceramic matrix composition disclosed herein has, e.g., at most 10% less, at most 15% less, at most 20% less, at most 25% less, at most 30% less, at most 35% less, at most 40% less, at most 50% less, at most 55% less, at most 60% less, at most 65% less, at most 70% less or at most 75% less channel formation on the outer surface of the ceramic matrix composition relative to the interior of the ceramic matrix composition.

In aspects of this embodiment, a ceramic matrix composition disclosed herein has, e.g., about 10% to about 20% less, about 10% to about 30% less, about 10% to about 40% less, about 10% to about 50% less, about 10% to about 60% less, about 10% to about 70% less, about 10% to about 80% less, about 10% to about 90% less, about 20% to about 30% less, about 20% to about 40% less, about 20% to about 50% less, about 20% to about 60% less, about 20% to about 70% less, about 20% to about 80% less, about 20% to about 90% less, about 30% to about 40% less, about 30% to about 50% less, about 30% to about 60% less, about 30% to about 70% less, about 30% to about 80% less, about 30% to about 90% less, about 40% to about 50% less, about 40% to about 60% less, about 40% to about 70% less, about 40% to about 80% less, about 40% to about 90% less, about 50% to about 60% less, about 50% to about 70% less, about 50% to about 80% less, about 50% to about 90% less, about 60% to about 70% less, about 60% to about 80% less, about 60% to about 90% less, about 70% to about 80% less, about 70% to about 90% less or about 80% to about 90% less channel formation on the outer surface of the ceramic matrix composition relative to the interior of the ceramic matrix composition.

In one embodiment, a ceramic matrix composition has a porosity sufficient to allow fluid to flow into its three-dimensional interconnected array of channels. In aspects of this embodiment, a ceramic matrix composition has a porosity of, e.g., about 10%, about 15%, about 20%, about 25%, about 30%, about 35%, about 40%, about 45%, about 50%, about 55%, about 60%, about 65%, about 70% or about 75% of the total volume of the ceramic matrix composition. In other aspects of this embodiment, a ceramic matrix composition has a porosity of, e.g., at least 10%, at least 15%, at least 20%, at least 25%, at least 30%, at least 35%, at least 40%, at least 45%, at least 50%, at least 55%, at least 60%, at least 65%, at least 70% or at least 75% of the total volume of the ceramic matrix composition. In yet other aspects of this embodiment, a ceramic matrix composition has a porosity of, e.g., at most 10%, at most 15%, at most 20%, at most 25%, at most 30%, at most 35%, at most 40%, at most 45%, at most 50%, at most 55%, at most 60%, at most 65%, at most 70% or at most 75% of the total volume of the ceramic matrix composition.

In yet other aspects of this embodiment, a ceramic matrix composition has a porosity of, e.g., about 10% to about 20%, about 10% to about 25%, about 10% to about 30%, about 10% to about 35%, about 10% to about 40%, about 10% to about 45%, about 10% to about 50%, about 10% to about 55%, about 10% to about 60%, about 10% to about 65%, about 10% to about 70%, about 10% to about 75%, about 20% to about 30%, about 20% to about 35%, about 20% to about 40%, about 20% to about 45%, about 20% to about 50%, about 20% to about 55%, about 20% to about 60%, about 20% to about 65%, about 20% to about 70%, about 20% to about 75%, about 30% to about 40%, about 30% to about 45%, about 30% to about 50%, about 30% to about 55%, about 30% to about 60%, about 30% to about 65%, about 30% to about 70%, about 30% to about 75%, about 40% to about 50%, about 40% to about 55%, about 40% to about 60%, about 40% to about 65%, about 40% to about 70%, about 40% to about 75%, about 45% to about 50%, about 45% to about 55%, about 45% to about 60%, about 45% to about 65%, about 45% to about 70%, about 45% to about 75%, about 50% to about 55%, about 50% to about 60%, about 50% to about 65%, about 50% to about 70%, about 50% to about 75%, about 55% to about 60%, about 55% to about 65%, about 55% to about 70%, about 55% to about 75%, about 60% to about 65%, about 60% to about 70%, about 60% to about 75%, about 65% to about 70%, about 65% to about 75% or about 70% to about 75% of the total volume of the ceramic matrix composition.

The porosity of a ceramic matrix composition disclosed herein enables the controlled absorption of a fluid using its three-dimensional interconnected array of channels. In aspects of this embodiment, the porosity of a ceramic matrix composition disclosed herein enables the controlled absorption of a fluid to a volume that is, e.g., about 1 time, about 2 times, about 3 times, about 4 times, about 5 times, about 6 times, about 7 times, about 8 times, about 9 times or about 10 times the weight of the ceramic matrix composition. In other aspects of this embodiment, the porosity of a ceramic matrix composition disclosed herein enables the controlled absorption of a fluid to a volume that is, e.g., at least 1 time, at least 2 times, at least 3 times, at least 4 times, at least 5 times, at least 6 times, at least 7 times, at least 8 times, at least 9 times or at least 10 times the weight of the ceramic matrix composition. In yet other aspects of this embodiment, the porosity of a ceramic matrix composition disclosed herein enables the controlled absorption of a fluid to a volume that is, e.g., at most 1 time, at most 2 times, at most 3 times, at most 4 times, at most 5 times, at most 6 times, at most 7 times, at most 8 times, at most 9 times or at most 10 times the weight of the ceramic matrix composition.

In yet other aspects of this embodiment, the porosity of a ceramic matrix composition disclosed herein enables the controlled absorption of a fluid to a volume that is, e.g., about 1 time to about 2 times, about 1 time to about 3 times, about 1 time to about 4 times, about 1 time to about 5 times, about 1 time to about 6 times, about 1 time to about 7 times, about 1 time to about 8 times, about 1 time to about 9 times, about 1 time to about 10 times, about 2 times to about 3 times, about 2 times to about 4 times, about 2 times to about 5 times, about 2 times to about 6 times, about 2 times to about 7 times, about 2 times to about 8 times, about 2 times to about 9 times, about 2 times to about 10 times, about 3 times to about 4 times, about 3 times to about 5 times, about 3 times to about 6 times, about 3 times to about 7 times, about 3 times to about 8 times, about 3 times to about 9 times, about 3 times to about 10 times, about 4 times to about 5 times, about 4 times to about 6 times, about 4 times to about 7 times, about 4 times to about 8 times, about 4 times to about 9 times, about 4 times to about 10 times, about 5 times to about 6 times, about 5 times to about 7 times, about 5 times to about 8 times, about 5 times to about 9 times, about 5 times to about 10 times, about 6 times to about 7 times, about 6 times to about 8 times, about 6 times to about 9 times, about 6 times to about 10 times, about 7 times to about 8 times, about 7 times to about 9 times, about 7 times to about 10 times, about 8 times to about 9 times, about 8 times to about 10 times or about 9 times to about 10 times the weight of the ceramic matrix composition.

The porosity of a ceramic matrix composition disclosed herein enables the controlled distribution of a fluid through its three-dimensional interconnected array of channels. In aspects of this embodiment, the porosity of a ceramic matrix composition disclosed herein enables the controlled distribution of a fluid through its three-dimensional interconnected array of channels so that the ceramic matrix composition is, e.g., about 65% saturated, about 70% saturated, about 75% saturated, about 80% saturated, about 85% saturated, about 90% saturated, about 95% saturated, about 97% saturated, about 98% saturated or about 99% saturated. In other aspects of this embodiment, the porosity of a ceramic matrix composition disclosed herein enables the controlled distribution of a fluid through its three-dimensional interconnected array of channels so that the ceramic matrix composition is, e.g., at least 65% saturated, at least 70% saturated, at least 75% saturated, at least 80% saturated, at least 85% saturated, at least 90% saturated, at least 95% saturated, at least 97% saturated, at least 98% saturated or at least 99% saturated. In yet other aspects of this embodiment, the porosity of a ceramic matrix composition disclosed herein enables the controlled distribution of a fluid through its three-dimensional interconnected array of channels so that the ceramic matrix composition is, e.g., at most 65% saturated, at most 70% saturated, at most 75% saturated, at most 80% saturated, at most 85% saturated, at most 90% saturated, at most 95% saturated, at most 97% saturated, at most 98% saturated or at most 99% saturated.

In still other aspects of this embodiment, the porosity of a ceramic matrix composition disclosed herein enables the controlled distribution of a fluid through its three-dimensional interconnected array of channels so that the ceramic matrix composition is, e.g., about 65% to about 75%, about 65% to about 85%, about 65% to about 95%, about 65% to about 97%, about 65% to about 98%, about 65% to about 99%, about 65% to about 100%, about 75% to about 85%, about 75% to about 95%, about 75% to about 97%, about 75% to about 98%, about 75% to about 99%, about 75% to about 100%, about 80% to about 85%, about 80% to about 95%, about 80% to about 97%, about 80% to about 98%, about 80% to about 99%, about 80% to about 100%, about 85% to about 95%, about 85% to about 97%, about 85% to about 98%, about 85% to about 99%, about 85% to about 100%, about 90% to about 95%, about 90% to about 97%, about 90% to about 98%, about 90% to about 99%, about 90% to about 100%, about 95% to about 97%, about 95% to about 98%, about 95% to about 99% or about 95% to about 100% saturated.

The porosity of a ceramic matrix composition disclosed herein enables the controlled evaporation of a fluid from the surface of the ceramic matrix composition. Evaporation is a type of vaporization of a liquid that occurs from the surface of a liquid into a gaseous phase that is not saturated with the evaporating substance. Evaporation is a surface phenomenon. The porosity of a ceramic matrix composition disclosed herein provides for sufficient evaporation of a fluid from the ceramic matrix composition without the formation of fluid condensation on a surface of the composition.

In aspects of this embodiment, porosity of a ceramic matrix composition disclosed herein enables the controlled evaporation of a fluid from the surface of the ceramic matrix composition so that the evaporation rate is, e.g., about 0.001 kg/sec, about 0.002 kg/sec, about 0.0025 kg/sec, about 0.003 kg/sec, about 0.004 kg/sec, about 0.005 kg/sec, about 0.006 kg/sec, about 0.007 kg/sec, about 0.0075 kg/sec, about 0.008 kg/sec, about 0.009 kg/sec, about 0.01 kg/sec, about 0.02 kg/sec, about 0.025 kg/sec, about 0.03 kg/sec, about 0.04 kg/sec, about 0.05 kg/sec, about 0.06 kg/sec, about 0.07 kg/sec, about 0.075 kg/sec, about 0.08 kg/sec, about 0.09 kg/sec, about 0.1 kg/sec, about 0.2 kg/sec, about 0.25 kg/sec, about 0.3 kg/sec, about 0.4 kg/sec, about 0.5 kg/sec, about 0.6 kg/sec, about 0.7 kg/sec or about 0.75 kg/sec. In other aspects of this embodiment, porosity of a ceramic matrix composition disclosed herein enables the controlled evaporation of a fluid from the surface of the ceramic matrix composition so that the evaporation rate is, e.g., at least 0.001 kg/sec, at least 0.002 kg/sec, at least 0.0025 kg/sec, at least 0.003 kg/sec, at least 0.004 kg/sec, at least 0.005 kg/sec, at least 0.006 kg/sec, at least 0.007 kg/sec, at least 0.0075 kg/sec, at least 0.008 kg/sec, at least 0.009 kg/sec, at least 0.01 kg/sec, at least 0.02 kg/sec, at least 0.025 kg/sec, at least 0.03 kg/sec, at least 0.04 kg/sec, at least 0.05 kg/sec, at least 0.06 kg/sec, at least 0.07 kg/sec, at least 0.075 kg/sec, at least 0.08 kg/sec, at least 0.09 kg/sec, at least 0.1 kg/sec, at least 0.2 kg/sec, at least 0.25 kg/sec, at least 0.3 kg/sec, at least 0.4 kg/sec, at least 0.5 kg/sec, at least 0.6 kg/sec, at least 0.7 kg/sec or at least 0.75 kg/sec. In yet other aspects of this embodiment, porosity of a ceramic matrix composition disclosed herein enables the controlled evaporation of a fluid from the surface of the ceramic matrix composition so that the evaporation rate is, e.g., at most 0.001 kg/sec, at most 0.002 kg/sec, at most 0.0025 kg/sec, at most 0.003 kg/sec, at most 0.004 kg/sec, at most 0.005 kg/sec, at most 0.006 kg/sec, at most 0.007 kg/sec, at most 0.0075 kg/sec, at most 0.008 kg/sec, at most 0.009 kg/sec, at most 0.01 kg/sec, at most 0.02 kg/sec, at most 0.025 kg/sec, at most 0.03 kg/sec, at most 0.04 kg/sec, at most 0.05 kg/sec, at most 0.06 kg/sec, at most 0.07 kg/sec, at most 0.075 kg/sec, at most 0.08 kg/sec, at most 0.09 kg/sec, at most 0.1 kg/sec, at most 0.2 kg/sec, at most 0.25 kg/sec, at most 0.3 kg/sec, at most 0.4 kg/sec, at most 0.5 kg/sec, at most 0.6 kg/sec, at most 0.7 kg/sec or at most 0.75 kg/sec.

In still other aspects of this embodiment, porosity of a ceramic matrix composition disclosed herein enables the controlled evaporation of a fluid from the surface of the ceramic matrix composition so that the evaporation rate is, e.g., about 0.001 kg/sec to about 0.005 kg/sec, about 0.001 kg/sec to about 0.01 kg/sec, about 0.001 kg/sec to about 0.05 kg/sec, about 0.001 kg/sec to about 0.1 kg/sec, about 0.001 kg/sec to about 0.5 kg/sec, about 0.0025 kg/sec to about 0.005 kg/sec, about 0.0025 kg/sec to about 0.01 kg/sec, about 0.0025 kg/sec to about 0.05 kg/sec, about 0.0025 kg/sec to about 0.1 kg/sec, about 0.0025 kg/sec to about 0.5 kg/sec, about 0.005 kg/sec to about 0.01 kg/sec, about 0.005 kg/sec to about 0.05 kg/sec, about 0.005 kg/sec to about 0.1 kg/sec, about 0.005 kg/sec to about 0.5 kg/sec, about 0.0075 kg/sec to about 0.01 kg/sec, about 0.0075 kg/sec to about 0.05 kg/sec, about 0.0075 kg/sec to about 0.1 kg/sec, about 0.0075 kg/sec to about 0.5 kg/sec, about 0.01 kg/sec to about 0.05 kg/sec, about 0.01 kg/sec to about 0.1 kg/sec, about 0.01 kg/sec to about 0.5 kg/sec, about 0.025 kg/sec to about 0.05 kg/sec, about 0.025 kg/sec to about 0.1 kg/sec, about 0.025 kg/sec to about 0.5 kg/sec, about 0.05 kg/sec to about 0.1 kg/sec, about 0.05 kg/sec to about 0.5 kg/sec or about 0.1 kg/sec to about 0.5 kg/sec.

A ceramic matrix composition disclosed herein has a strong dry compressive strength. In aspects of this embodiment, a ceramic matrix composition disclosed herein has a dry compressive strength of, e.g., about 5,000 psi, about 5,500 psi, about 6,000 psi, about 6,500 psi, about 7,000 psi, about 7,500 psi, about 8,000 psi, about 8,500 psi, about 9,000 psi, about 9,500 psi, about 10,000 psi, about 10,500 psi, about 11,000 psi, about 11,500 psi or about 12,000 psi. In other aspects of this embodiment, a ceramic matrix composition disclosed herein has a dry compressive strength of, e.g., at least 5,000 psi, at least 6,000 psi, at least 7,000 psi, at least 8,000 psi, at least 9,000 psi, at least 10,000 psi, at least 11,000 psi or at least 12,000 psi. In yet other aspects of this embodiment, a ceramic matrix composition disclosed herein has a dry compressive strength of, e.g., at most 5,000 psi, at most 6,000 psi, at most 7,000 psi, at most 8,000 psi, at most 9,000 psi, at most 10,000 psi, at most 11,000 psi or at most 12,000 psi.

In still other aspects of this embodiment, a ceramic matrix composition disclosed herein has a dry compressive strength of, e.g., about 5,000 psi to about 6,000 psi, about 5,000 psi to about 7,000 psi, about 5,000 psi to about 8,000 psi, about 5,000 psi to about 9,000 psi, about 5,000 psi to about 10,000 psi, about 5,000 psi to about 11,000 psi, about 5,000 psi to about 12,000 psi, about 6,000 psi to about 7,000 psi, about 6,000 psi to about 8,000 psi, about 6,000 psi to about 9,000 psi, about 6,000 psi to about 10,000 psi, about 6,000 psi to about 11,000 psi, about 6,000 psi to about 12,000 psi, about 7,000 psi to about 8,000 psi, about 7,000 psi to about 9,000 psi, about 7,000 psi to about 10,000 psi, about 7,000 psi to about 11,000 psi, about 7,000 psi to about 12,000 psi, about 8,000 psi to about 9,000 psi, about 8,000 psi to about 10,000 psi, about 8,000 psi to about 11,000 psi, about 8,000 psi to about 12,000 psi, about 9,000 psi to about 10,000 psi, about 9,000 psi to about 11,000 psi, about 9,000 psi to about 12,000 psi, about 10,000 psi to about 11,000 psi, about 10,000 psi to about 12,000 psi or about 11,000 psi to about 12,000 psi.

A ceramic matrix composition disclosed herein has a strong dry impact strength. In aspects of this embodiment, a ceramic matrix composition disclosed herein has a dry impact strength of, e.g., about 500 psi, about 700 psi, about 750 psi, about 800 psi, about 850 psi, about 900 psi, about 950 psi, about 1,000 psi, about 1,050 psi, about 1,100 psi, about 1,150 psi, about 1,200 psi, about 1,250 psi, about 1,300 psi, about 1,350 psi, about 1,400 psi, about 1,450 psi or about 1,500 psi. In other aspects of this embodiment, a ceramic matrix composition disclosed herein has a dry compressive strength of, e.g., at least 700 psi, at least 800 psi, at least 900 psi, at least 1,000 psi, at least 1,100 psi, at least 1,200 psi, at least 1,300 psi, at least 1,400 psi or at least 1,500 psi. In yet other aspects of this embodiment, a ceramic matrix composition disclosed herein has a dry compressive strength of, e.g., at most 700 psi, at most 800 psi, at most 900 psi, at most 1,000 psi, at most 1,100 psi, at most 1,200 psi, at most 1,300 psi, at most 1,400 psi or at most 1,500 psi.

In still other aspects of this embodiment, a ceramic matrix composition disclosed herein has a dry compressive strength of, e.g., about 700 psi to about 800 psi, about 700 psi to about 900 psi, about 700 psi to about 1,000 psi, about 700 psi to about 1,100 psi, about 700 psi to about 1,200 psi, about 700 psi to about 1,300 psi, about 700 psi to about 1,400 psi, about 700 psi to about 1,500 psi, about 800 psi to about 900 psi, about 800 psi to about 1,000 psi, about 800 psi to about 1,100 psi, about 800 psi to about 1,200 psi, about 800 psi to about 1,300 psi, about 800 psi to about 1,400 psi, about 800 psi to about 1,500 psi, about 900 psi to about 1,000 psi, about 900 psi to about 1,100 psi, about 900 psi to about 1,200 psi, about 900 psi to about 1,300 psi, about 900 psi to about 1,400 psi, about 900 psi to about 1,500 psi, about 1,000 psi to about 1,100 psi, about 1,000 psi to about 1,200 psi, about 1,000 psi to about 1,300 psi, about 1,000 psi to about 1,400 psi, about 1,000 psi to about 1,500 psi, about 1,100 psi to about 1,200 psi, about 1,100 psi to about 1,300 psi, about 1,100 psi to about 1,400 psi, about 1,100 psi to about 1,500 psi, about 1,200 psi to about 1,300 psi, about 1,200 psi to about 1,400 psi, about 1,200 psi to about 1,500 psi, about 1,300 psi to about 1,400 psi, about 1,300 psi to about 1,500 psi or about 1,400 psi to about 1,500 psi.

In one embodiment, a ceramic matrix composition disclosed herein comprises a hydraulic gypsum cement material, a non-hydraulic gypsum cement material, a crosslinked synthetic hydrogel and a binder. In aspects of this embodiment, a ceramic matrix composition disclosed herein comprises about 85% to about 99% of a hydraulic gypsum cement material, about 0.1% to about 5% of a non-hydraulic gypsum cement material, about 0.1% to about 10% of a crosslinked synthetic hydrogel and about 0.1% to about 10% of a binder based on the total dry weight of the composition.

In aspects of this embodiment, a ceramic matrix composition disclosed herein comprises about 88% to about 98% of a hydraulic gypsum cement material, about 0.25% to about 4% of a non-hydraulic gypsum cement material, about 0.25% to about 8% of a crosslinked synthetic hydrogel and about 0.25% to about 8% of a binder based on the total dry weight of the composition. In other aspects of this embodiment, a ceramic matrix composition disclosed herein comprises about 89% to about 97% of a hydraulic gypsum cement material, about 0.5% to about 3% of a non-hydraulic gypsum cement material, about 0.5% to about 7% of a crosslinked synthetic hydrogel and about 0.5% to about 7% of a binder based on the total dry weight of the composition. In yet other aspects of this embodiment, a ceramic matrix composition disclosed herein comprises about 90% to about 96% of a hydraulic gypsum cement material, about 0.6% to about 2% of a non-hydraulic gypsum cement material, about 1% to about 6% of a crosslinked synthetic hydrogel and about 1% to about 6% of a binder based on the total dry weight of the composition. In still other aspects of this embodiment, a ceramic matrix composition disclosed herein comprises about 91% to about 95% of a hydraulic gypsum cement material, about 0.7% to about 1.5% of a non-hydraulic gypsum cement material, about 2% to about 5% of a crosslinked synthetic hydrogel and about 2% to about 5% of a binder based on the total dry weight of the composition. In other aspects of this embodiment, a ceramic matrix composition disclosed herein comprises about 92% to about 94% of a hydraulic gypsum cement material, about 0.8% to about 1.0% of a non-hydraulic gypsum cement material, about 3% to about 4% of a crosslinked synthetic hydrogel and about 3% to about 4% of a binder based on the total dry weight of the composition. In yet other aspects of this embodiment, a ceramic matrix composition disclosed herein comprises about 93.2% of a hydraulic gypsum cement material, about 0.9% of a non-hydraulic gypsum cement material, about 2.5% of a crosslinked synthetic hydrogel and about 2.5% of a binder based on the total dry weight of the composition.

In another embodiment, a ceramic matrix composition disclosed herein comprises a hydraulic gypsum cement material, a non-hydraulic gypsum cement material, a crosslinked polyacrylamide copolymer hydrogel and a polyvinyl acetate. In aspects of this embodiment, a ceramic matrix composition disclosed herein comprises about 85% to about 99% of a hydraulic gypsum cement material, about 0.1% to about 5% of a non-hydraulic gypsum cement material, about 0.1% to about 10% of a crosslinked polyacrylamide copolymer hydrogel and about 0.1% to about 10% of a polyvinyl acetate based on the total dry weight of the composition. In aspects of this embodiment, a ceramic matrix composition disclosed herein comprises about 88% to about 98% of a hydraulic gypsum cement material, about 0.25% to about 4% of a non-hydraulic gypsum cement material, about 0.25% to about 8% of a crosslinked polyacrylamide copolymer hydrogel and about 0.25% to about 8% of a polyvinyl acetate based on the total dry weight of the composition. In other aspects of this embodiment, a ceramic matrix composition disclosed herein comprises about 89% to about 97% of a hydraulic gypsum cement material, about 0.5% to about 3% of a non-hydraulic gypsum cement material, about 0.5% to about 7% of a crosslinked polyacrylamide copolymer hydrogel and about 0.5% to about 7% of a polyvinyl acetate based on the total dry weight of the composition. In yet other aspects of this embodiment, a ceramic matrix composition disclosed herein comprises about 90% to about 96% of a hydraulic gypsum cement material, about 0.6% to about 2% of a non-hydraulic gypsum cement material, about 1% to about 6% of a crosslinked polyacrylamide copolymer hydrogel and about 1% to about 6% of a polyvinyl acetate based on the total dry weight of the composition. In still other aspects of this embodiment, a ceramic matrix composition disclosed herein comprises about 91% to about 95% of a hydraulic gypsum cement material, about 0.7% to about 1.5% of a non-hydraulic gypsum cement material, about 2% to about 5% of a crosslinked polyacrylamide copolymer hydrogel and about 2% to about 5% of a polyvinyl acetate based on the total dry weight of the composition. In other aspects of this embodiment, a ceramic matrix composition disclosed herein comprises about 92% to about 94% of a hydraulic gypsum cement material, about 0.8% to about 1.0% of a non-hydraulic gypsum cement material, about 3% to about 4% of a crosslinked polyacrylamide copolymer hydrogel and about 3% to about 4% of a polyvinyl acetate based on the total dry weight of the composition. In yet other aspects of this embodiment, a ceramic matrix composition disclosed herein comprises about 93.2% of a hydraulic gypsum cement material, about 0.9% of a non-hydraulic gypsum cement material, about 2.5% of a crosslinked polyacrylamide copolymer hydrogel and about 2.5% of a polyvinyl acetate based on the total dry weight of the composition.

In another embodiment, a ceramic matrix composition disclosed herein comprises a hydraulic gypsum cement material, a non-hydraulic gypsum cement material, a crosslinked synthetic hydrogel, a binder and an antimicrobial agent. In aspects of this embodiment, a ceramic matrix composition disclosed herein comprises about 85% to about 99% of a hydraulic gypsum cement material, about 0.1% to about 5% of a non-hydraulic gypsum cement material, about 0.1% to about 10% of a crosslinked synthetic hydrogel, about 0.1% to about 10% of a binder and about 0.1% to about 5% of an antimicrobial agent based on the total dry weight of the composition. In aspects of this embodiment, a ceramic matrix composition disclosed herein comprises about 88% to about 98% of a hydraulic gypsum cement material, about 0.25% to about 4% of a non-hydraulic gypsum cement material, about 0.25% to about 8% of a crosslinked synthetic hydrogel, about 0.25% to about 8% of a binder and about 0.25% to about 4% of an antimicrobial agent based on the total dry weight of the composition. In other aspects of this embodiment, a ceramic matrix composition disclosed herein comprises about 89% to about 97% of a hydraulic gypsum cement material, about 0.5% to about 3% of a non-hydraulic gypsum cement material, about 0.5% to about 7% of a crosslinked synthetic hydrogel, about 0.5% to about 7% of a binder and about 0.5% to about 3% of an antimicrobial agent based on the total dry weight of the composition. In yet other aspects of this embodiment, a ceramic matrix composition disclosed herein comprises about 90% to about 96% of a hydraulic gypsum cement material, about 0.6% to about 2% of a non-hydraulic gypsum cement material, about 1% to about 6% of a crosslinked synthetic hydrogel, about 1% to about 6% of a binder and about 0.6% to about 2% of an antimicrobial agent based on the total dry weight of the composition. In still other aspects of this embodiment, a ceramic matrix composition disclosed herein comprises about 91% to about 95% of a hydraulic gypsum cement material, about 0.7% to about 1.5% of a non-hydraulic gypsum cement material, about 2% to about 5% of a crosslinked synthetic hydrogel, about 2% to about 5% of a binder and about 0.7% to about 1.5% of an antimicrobial agent based on the total dry weight of the composition. In other aspects of this embodiment, a ceramic matrix composition disclosed herein comprises about 92% to about 94% of a hydraulic gypsum cement material, about 0.8% to about 1.0% of a non-hydraulic gypsum cement material, about 3% to about 4% of a crosslinked synthetic hydrogel, about 3% to about 4% of a binder and about 0.8% to about 1.0% of an antimicrobial agent based on the total dry weight of the composition. In yet other aspects of this embodiment, a ceramic matrix composition disclosed herein comprises about 93.2% of a hydraulic gypsum cement material, about 0.9% of a non-hydraulic gypsum cement material, about 2.5% of a crosslinked synthetic hydrogel, about 2.5% of a binder and about 0.9% of an antimicrobial agent based on the total dry weight of the composition.

In another embodiment, a ceramic matrix composition disclosed herein comprises a hydraulic gypsum cement material, a non-hydraulic gypsum cement material, a polyacrylamide copolymer, a polyvinyl acetate and a metal oxide. In aspects of this embodiment, a ceramic matrix composition disclosed herein comprises about 85% to about 99% of a hydraulic gypsum cement material, about 0.1% to about 5% of a non-hydraulic gypsum cement material, about 0.1% to about 10% of a crosslinked polyacrylamide copolymer hydrogel, about 0.1% to about 10% of a polyvinyl acetate and about 0.1% to about 5% of a metal oxide based on the total dry weight of the composition. In aspects of this embodiment, a ceramic matrix composition disclosed herein comprises about 88% to about 98% of a hydraulic gypsum cement material, about 0.25% to about 4% of a non-hydraulic gypsum cement material, about 0.25% to about 8% of a crosslinked polyacrylamide copolymer hydrogel, about 0.25% to about 8% of a polyvinyl acetate and about 0.25% to about 4% of a metal oxide based on the total dry weight of the composition. In other aspects of this embodiment, a ceramic matrix composition disclosed herein comprises about 89% to about 97% of a hydraulic gypsum cement material, about 0.5% to about 3% of a non-hydraulic gypsum cement material, about 0.5% to about 7% of a crosslinked polyacrylamide copolymer hydrogel, about 0.5% to about 7% of a polyvinyl acetate and about 0.5% to about 3% of a metal oxide based on the total dry weight of the composition. In yet other aspects of this embodiment, a ceramic matrix composition disclosed herein comprises about 90% to about 96% of a hydraulic gypsum cement material, about 0.6% to about 2% of a non-hydraulic gypsum cement material, about 1% to about 6% of a crosslinked polyacrylamide copolymer hydrogel, about 1% to about 6% of a polyvinyl acetate and about 0.6% to about 2% of a metal oxide based on the total dry weight of the composition. In still other aspects of this embodiment, a ceramic matrix composition disclosed herein comprises about 91% to about 95% of a hydraulic gypsum cement material, about 0.7% to about 1.5% of a non-hydraulic gypsum cement material, about 2% to about 5% of a crosslinked polyacrylamide copolymer hydrogel, about 2% to about 5% of a polyvinyl acetate and about 0.7% to about 1.5% of a metal oxide based on the total dry weight of the composition. In other aspects of this embodiment, a ceramic matrix composition disclosed herein comprises about 92% to about 94% of a hydraulic gypsum cement material, about 0.8% to about 1.0% of a non-hydraulic gypsum cement material, about 3% to about 4% of a crosslinked polyacrylamide copolymer hydrogel, about 3% to about 4% of a polyvinyl acetate and about 0.8% to about 1.0% of a metal oxide based on the total dry weight of the composition. In yet other aspects of this embodiment, a ceramic matrix composition disclosed herein comprises about 93.2% of a hydraulic gypsum cement material, about 0.9% of a non-hydraulic gypsum cement material, about 2.5% of a crosslinked polyacrylamide copolymer hydrogel, about 2.5% of a polyvinyl acetate and about 0.9% of a metal oxide based on the total dry weight of the composition.

A ceramic composition disclosed herein comprises both a hydraulic gypsum cement material and a non-hydraulic gypsum cement material. Gypsum is a soft sulfate mineral salt composed of calcium sulfate dehydrate ($CaSO_4.2H_2O$) that is moderately water-soluble (about 2.0 g/L to about 2.5 g/L at 25° C.). It has a hardness of 2 on the Mohs scale of mineral hardness. In contrast to most other salts, gypsum exhibits retrograde solubility, becoming less soluble at higher temperatures.

Naturally occurring gypsum occurs in sedimentary rock formations, and is found in over 85 countries including the United States, Canada and Mexico. Gypsum rock is mined or quarried, crushed and ground into a fine powder. In a process called calcining, the powder is heated to approximately 350 degrees F., driving off three fourths of the chemically combined water. The calcined gypsum, or hemihydrate, becomes the base for gypsum plaster, gypsum board and other gypsum products.

Besides naturally-occurring, gypsum can also be synthetically produced. For example, synthetic gypsum can be made using a desulfurization process. One such example is Flue-Gas Desulfurization (FGD) gypsum. FGD gypsum is a by-product of desulfurization of flue gas from the stacks of fossil-fueled power plants, emissions captured from smoke stacks can be purified into a hard substance and manufactured into gypsum. Today, almost half of all gypsum used in the United States is FGD gypsum. Synthetic gypsum has the same chemical composition as naturally-occurring gypsum, i.e., calcium sulfate dihydrate ($CaSO_4.2H_2O$).

When gypsum is heated in air it loses water and converts first to calcium sulfate hemihydrate ($CaSO_4.\frac{1}{2}H_2O$), also known as bassanite, and often called "plaster of Paris" or simply "plaster" and, if heated further, to anhydrous calcium sulfate ($CaSO_4$), also known as calcium sulfate anhydrite.

Cement is used as a substance that sets and hardens and can bind other materials together. Cements can be characterized as being either non-hydraulic (drying-type) or hydraulic (setting-type), depending upon the ability of the cement to set in the presence of water. Non-hydraulic cement sets by carbonation in the presence of carbon dioxide. Typically this is achieved by allowing non-hydraulic cement to air dry, thereby allowing the cement to react with the carbon dioxide naturally present in the air. As such, non-hydraulic cement will not set underwater or in wet conditions, like inside a thick wall.

Non-hydraulic cement is primarily composed of calcium hydroxide, $Ca(OH)_2$. Calcium hydroxide is made by heating calcium carbonate ($CaCO_3$) with other materials (such as clay) to temperatures above 850° C., in a process known as calcination. This process liberates a molecule of carbon dioxide from the calcium carbonate to form calcium oxide (CaO). Also known as quicklime, calcium oxide is then mixed with water to make calcium hydroxide, also known as slaked lime. The calcium hydroxide can then be mixed with other additives like a binder, a pozzolan, a coloring agent and/or biocide to produce non-hydraulic cement. After application, air-drying allows excess water to evaporate and carbonation to begin, which converts calcium hydroxide into calcium carbonate, thereby setting the non-hydraulic cement. Non-hydraulic cement typically contains 95% or more calcium hydroxide.

Hydraulic cement sets by hydration, i.e., in the presence of water. When exposed to water, hydraulic cement sets and becomes a binder due to a chemical reaction between the dry ingredients and water that results in the formation of in mineral hydrates. This allows setting of hydraulic cement in wet condition or underwater.

Hydraulic cement is also made by first producing calcium oxide by calcination. However, instead of adding water to make slack lime, the calcium oxide is blended with silicates and oxides to form calcium silicates and other cementitious compounds. Four main silicate and oxide components used in the manufacture of most hydraulic cements are belite ($2CaO.SiO_2$ or $C_2S$), alite ($3CaO.SiO_2$ or C3S), tricalcium aluminate ($3CaO.Al_2O_2$ or C3A), also known as celite, and brownmillerite ($4CaO.Al_2O_2.Fe_2O_3$ or C4AF). The resulting hard substance, called clinker, is then ground into a powder and stored. A hydraulic cement can include differing amounts of silicates and oxides as well as other additives which result in many different formulations, including, without limitation, Portland cement, Portland cement blends, Pozzolan-lime cements, slag-lime cements, supersulfated cements, calcium sulfoaluminate cements, natural cements and geopolymer cements.

Portland cement typically comprises between about 19% to about 23% silicon dioxide ($SiO_2$), about 2.5% to about 6% aluminum oxide ($Al_2O_3$), 0% to about 6% ferric oxide ($Fe_2O_3$), about 61% to about 67% calcium oxide (CaO), about 1.5% to about 5% magnesium oxide (MgO) and about 1.5% to about 4.5% sulfate ($SO_3$). In addition, Portland cement may contain up to 5% of minor additional constituents. The ratio of calcium oxide to silicon dioxide should not be less than 2.0 and the magnesium oxide content should not exceed 5.0% by mass. There are five major types of Portland cement. Type I Portland cement comprises about 55% (C3S), 19% (C2S), 10% (C3A), 7% (C4AF), 2.8% MgO, 2.9% (SO3) and 1.0% free CaO. Type II Portland cement comprises about 51% (C3S), 24% (C2S), 6% (C3A), 11% (C4AF), 2.9% MgO, 2.5% (SO3) and 1.0% free CaO. Type III Portland cement comprises about 57% (C3S), 19% (C2S), 10% (C3A), 7% (C4AF), 3.0% MgO, 3.1% (S03) and 1.3% free CaO. Type IV Portland cement comprises about 28% (C3S), 49% (C2S), 4% (C3A), 12% (C4AF), 1.8% MgO, 1.9% (SO3) and 0.8% free CaO. Type V Portland cement comprises about 38% (C3S), 43% (C2S), 4% (C3A), 9% (C4AF), 1.9% MgO, 1.8% (SO3) and 0.8% free CaO.

Portland cement blends include artificial pozzolans (blast furnace slag, silica fume, and fly ash) or naturally-occurring pozzolans (siliceous or siliceous aluminous materials such as volcanic ash glasses, calcined clays and shale). Non-limiting examples of Portland cement blends include Portland-slag cement, Portland-silica fume cement, Portland-fly ash cement, Portland-pozzolan cement, masonry cements, expansive cements and very finely ground cements.

Portland-slag cement is a blend of Portland cement and up to about 95% blast furnace slag. Blast furnace slag is a glass-like by product left over after a desired metal has been smelted from its raw ore. Generally a mixture of metal oxides and silicon dioxide ($SiO_2$), slags may also contain metal sulfides and elemental metals. For example, blast furnace slag may comprise 35% $SiO_2$, 12% $Al_2O_3$, 1% $Fe_2O_3$ and 40% CaO.

Portland-silica fume cement is a blend of Portland cement and from about 3% to about 20% silica fume. Silica fume is an ultrafine powder collected as a by-product in the carbothermic reduction of high-purity quartz with carbonaceous materials like coal, coke, wood-chips in the production of silicon and ferrosilicon alloys. Also known as microsilica, silica fume is an amorphous (non-crystalline) polymorph of silicon dioxide ($SiO_2$). For example, silica fume may comprise 80% to 97% $SiO_2$ and less than 1% CaO.

Portland-fly ash cement is a blend of Portland cement and up to about 40% fly ash. Fly ash, also known as "pulverised fuel ash" is composed of the fine particles that are driven out of the boiler with the flue gases. All fly ash includes substantial amounts of both amorphous and crystalline silicon dioxide ($SiO_2$), aluminum oxide ($Al_2O_3$), iron oxide ($Fe_2O_3$) and calcium oxide (CaO). Class F (siliceous) fly ash which contains less than 7% calcium oxide and Class C (calcareous) fly ash which generally contains more than 20% calcium oxide. For example, Class F fly ash may comprise 52% $SiO_2$, 23% $Al_2O_3$, 11% $Fe_2O_3$ and 5% CaO, while a Class C fly ash may comprises 35% $SiO_2$, 18% $Al_2O_3$, 6% $Fe_2O_3$ and 21% CaO.

Portland-pozzolanic cement is a blend of Portland cement and up to about 55% of naturally-occurring pozzolans.

Pozzolan-lime cements, slag-lime cements, supersulfated cements, calcium sulfoaluminate cements, natural cements and geopolymer cements. Ground granulated blast-furnace slag is not hydraulic on its own, but is "activated" by addition of alkalis, most economically using lime. They are similar to pozzolan lime cements in their properties. Only granulated slag (i.e. water-quenched, glassy slag) is effective as a cement component. Supersulfated cements contain about 80% ground granulated blast furnace slag, 15% gypsum or calcium anhydrite and a little Portland clinker or lime as an activator. Calcium aluminate cements are hydraulic cements made primarily from limestone and bauxite. The active ingredients are monocalcium aluminate $CaAl_2O_4$ (or $CaO.Al_2O_3$ or CA) and mayenite $Ca_{12}Al_{14}O_{33}$ (12 CaO.7 $Al_2O_3$ or C12A7). Strength forms by hydration to calcium aluminate hydrates. Calcium sulfoaluminate cements are made from clinkers that include ye'elimite ($Ca_4(AlO_2)6SO_4$ or C4A3S) as a primary phase. They are used in expansive cements, in ultra-high early strength cements, and in "low-energy" cements. Geopolymer cements are made from mixtures of water-soluble alkali metal silicates and aluminosilicate mineral powders such as fly ash and metakaolin.

A hydraulic gypsum cement material is an extremely hard material when dry, has high compressive strength, and has high water absorption resistance while giving extremely fine detail duplication. Non limiting examples of a commercially available hydraulic gypsum cement material includes USG HYDRO-STONE®.

In one embodiment, a hydraulic gypsum cement material may comprise calcium sulfate hemihydrate, crystalline silica or silicon dioxide and a cement. In aspects of this embodiment, a non-hydraulic gypsum cement material can comprise at least 85% calcium sulfate hemihydrate, about 0.1% to about 10% silicon dioxide and/or silicon-oxygen tetrahedral and 0.1% to about 10% of a cement. In other aspects of this embodiment, a non-hydraulic gypsum cement material can comprise at least 90% calcium sulfate hemihydrate, about 0.5% to about 7.5% silicon dioxide and/or silicon-oxygen tetrahedral and 0.5% to about 7.5% of a cement. In yet other aspects of this embodiment, a non-hydraulic gypsum cement material can comprise at least 95% calcium sulfate hemihydrate, about 1% to about 5% silicon dioxide and/or silicon-oxygen tetrahedral and 1% to about 5% of a cement.

In aspects of this embodiment, a non-hydraulic gypsum cement material can comprise at least 85% calcium sulfate hemihydrate, no more than 10% silicon dioxide and/or silicon-oxygen tetrahedral and no more than 10% of a cement. In other aspects of this embodiment, a non-hydraulic gypsum cement material can comprise at least 90% calcium sulfate hemihydrate, no more than 7.5% silicon dioxide and/or silicon-oxygen tetrahedral and no more than 7.5% of a cement. In yet other aspects of this embodiment, a non-hydraulic gypsum cement material can comprise at least 95% calcium sulfate hemihydrate, no more than 5% silicon dioxide and/or silicon-oxygen tetrahedral and no more than 5% of a cement.

In aspects of this embodiment, a non-hydraulic gypsum cement material can comprise at least 85% calcium sulfate hemihydrate, about 0.1% to about 10% silicon dioxide and/or silicon-oxygen tetrahedral and 0.1% to about 10% of a Portland cement. In other aspects of this embodiment, a non-hydraulic gypsum cement material can comprise at least 90% calcium sulfate hemihydrate, about 0.5% to about 7.5% silicon dioxide and/or silicon-oxygen tetrahedral and 0.5% to about 7.5% of a Portland cement. In yet other aspects of this embodiment, a non-hydraulic gypsum cement material can comprise at least 95% calcium sulfate hemihydrate, about 1% to about 5% silicon dioxide and/or silicon-oxygen tetrahedral and 1% to about 5% of a Portland cement.

In aspects of this embodiment, a non-hydraulic gypsum cement material can comprise at least 85% calcium sulfate hemihydrate, no more than 10% silicon dioxide and/or silicon-oxygen tetrahedral and no more than 10% of a Portland cement. In other aspects of this embodiment, a non-hydraulic gypsum cement material can comprise at least 90% calcium sulfate hemihydrate, no more than 7.5% silicon dioxide and/or silicon-oxygen tetrahedral and no more than 7.5% of a Portland cement. In yet other aspects of this embodiment, a non-hydraulic gypsum cement material can comprise at least 95% calcium sulfate hemihydrate, no more than 5% silicon dioxide and/or silicon-oxygen tetrahedral and no more than 5% of a Portland cement.

In an embodiment, a ceramic composition disclosed herein comprises a hydraulic gypsum cement material. In aspect of this embodiment, a ceramic composition can comprise about 85% to about 99% of a hydraulic gypsum cement material based on the total dry weight of the composition. In another aspect of this embodiment, a ceramic composition can comprise about 88% to about 98% of a hydraulic gypsum cement material. In yet another aspect of this embodiment, a ceramic composition can comprise about 89% to about 97% of a hydraulic gypsum cement material. In still another aspect of this embodiment, a ceramic composition can comprise about 90% to about 96% of a hydraulic gypsum cement material. In another aspect of this embodiment, a ceramic composition can comprise about 91% to about 95% of a hydraulic gypsum cement material. In yet another aspect of this embodiment, a ceramic composition can comprise about 92% to about 94% of a hydraulic gypsum cement material. In still another aspect of this embodiment, a ceramic composition can comprise about 93% of a hydraulic gypsum cement material.

A non-hydraulic gypsum cement material is plaster-based compound that includes other materials that increase hardness as well as increase binding and adherence properties. Non limiting examples of a commercially available non-hydraulic gypsum cement material includes DURHAM ROCK HARD WATER PUTTY®.

A non-hydraulic gypsum cement material may comprise calcium sulfate hemihydrate and talc. Talc is a mineral composed of hydrated magnesium silicate with the chemical formula $H_2Mg_3(SiO_3)_4$ or $Mg_3Si_4O_{10}(OH)_2$. The structure of talc is composed of $Si_2O_5$ sheets with magnesium sandwiched between sheets in octahedral sites. Talc is used to flux the composition and improve strength and vitrification or the formation of a non-crystalline amorphous solid, e.g., a glass state.

A non-hydraulic gypsum cement material disclosed herein may also include a low-molecular-weight carbohydrate. Used as a binding agent, low-molecular-weight carbohydrates include any three to nine carbon polyhydroxy aldehyde, ketone, alcohol, acid, their simple derivatives and their polymers having acetal type linkages. One example of a low-molecular-weight carbohydrate is dextrin. Dextrin comprises a group of low-molecular-weight carbohydrates produced by the hydrolysis of starch, amylopectin or glycogen. Dextrins are mixtures of polymers of D-glucose units linked by α-(1,4) or α-(1,6) glyosidic bonds, such as, e.g., oligo(α-1,4-d-glucose) or oligo(α-1,6-d-glucose). Examples of dextrins include, without limitation, yellow dextrin, maltodextrin, cyclodextrin, cylic dextrin, amylodextrin, α-limited dextrin and β-limited dextrin.

A non-hydraulic gypsum cement material disclosed herein may also include crystalline silica or silicon dioxide ($SiO_2$) or quartz or silicon-oxygen tetrahedral ($SiO_4$).

A non-hydraulic gypsum cement material disclosed herein may also include a metal oxide. In one aspect of this embodiment, the metal oxide is yellow iron oxide In one embodiment, a non-hydraulic gypsum cement material can comprise calcium sulfate hemihydrate, talc and a low-molecular-weight carbohydrate, and optionally silicon dioxide and/or silicon-oxygen tetrahedral and optionally a metal oxide. In aspects of this embodiment, a non-hydraulic gypsum cement material can comprise about 60% to about 90% calcium sulfate hemihydrate, about 1% to about 25% talc, 0% to about 20% of a low-molecular-weight carbohydrate, 0% to about 5% silicon dioxide and/or silicon-oxygen tetrahedral and 0% to about 5% of a metal oxide. In other aspects of this embodiment, a non-hydraulic gypsum cement material can comprise about 65% to about 85% calcium sulfate hemihydrate, about 2.5% to about 20% talc, about 1% to about 15% of a low-molecular-weight carbohydrate, 0% to about 2.5% silicon dioxide and/or silicon-oxygen tetrahedral and 0% to about 2.5% of a metal oxide. In yet other aspects of this embodiment, a non-hydraulic gypsum cement material can comprise about 70% to about 80% calcium sulfate hemihydrate, about 5% to about 15% talc, about 5% to about 10% of a low-molecular-weight carbohydrate, 0% to about 1% silicon dioxide and/or silicon-oxygen tetrahedral and 0% to about 1% of a metal oxide.

In another embodiment, a non-hydraulic gypsum cement material can comprise calcium sulfate hemihydrate, talc and a dextrin, and optionally a silicon dioxide and/or silicon-oxygen tetrahedral and optionally an iron oxide. In aspects of this embodiment, a non-hydraulic gypsum cement material can comprise about 60% to about 90% calcium sulfate hemihydrate, about 1% to about 25% talc, 0% to about 20% dextrin, 0% to about 5% silicon dioxide and/or silicon-oxygen tetrahedral and 0% to about 5% iron oxide. In other aspects of this embodiment, a non-hydraulic gypsum cement material can comprise about 65% to about 85% calcium sulfate hemihydrate, about 2.5% to about 20% talc, about 1% to about 15% dextrin, 0% to about 2.5% silicon dioxide and/or silicon-oxygen tetrahedral and 0% to about 2.5% iron oxide. In yet other aspects of this embodiment, a non-hydraulic gypsum cement material can comprise about 70% to about 80% calcium sulfate hemihydrate, about 5% to about 15% talc, about 5% to about 10% dextrin, 0% to about 1% silicon dioxide and/or silicon-oxygen tetrahedral and 0% to about 1% iron oxide.

In an embodiment, a ceramic composition disclosed herein comprises a non-hydraulic gypsum cement material. In aspect of this embodiment, a ceramic composition can comprise about 0.1% to about 5% of a non-hydraulic gypsum cement material based on the total dry weight of the composition. In another aspect of this embodiment, a ceramic composition can comprise about 0.25% to about 4% of a non-hydraulic gypsum cement material. In yet another aspect of this embodiment, a ceramic composition can comprise about 0.5% to about 3% of a non-hydraulic gypsum cement material. In still another aspect of this embodiment, a ceramic composition can comprise about 0.6% to about 2% of a non-hydraulic gypsum cement material. In another aspect of this embodiment, a ceramic composition can comprise about 0.7% to about 1.5% of a non-hydraulic gypsum cement material. In yet another aspect of this embodiment, a ceramic composition can comprise about 0.8% to about 1% of a non-hydraulic gypsum cement material. In still another aspect of this embodiment, a ceramic composition can comprise about 0.9% of a non-hydraulic gypsum cement material.

A ceramic matrix composition disclosed herein comprises a cross-linked synthetic hydrogel. A cross-linked synthetic hydrogel is a macromolecular hydrophilic structure formed by a network (or net-like) of crosslinked synthetic polymers. During the method of making a ceramic composition disclosed herein, a cross-linked synthetic hydrogel is added in a swollen state. During the setting process, as fluid evaporates from the slurry mixture, a cross-linked synthetic hydrogel disclosed herein loses its fluid and shrinks. This shrinkage results in the formation of a three-dimensional interconnected array of channels that creates the porosity of a ceramic matrix composition disclosed herein. Upon exposure to fluid, the cross-linked synthetic hydrogel facilitates the controlled absorption of the fluid, its controlled distribution through the interconnected array of channels throughout the ceramic matrix composition disclosed herein as well as the controlled evaporation of the fluid from a surface of the ceramic matrix composition disclosed herein. This hydrophilic network structure along with void imperfections enables the hydrogel to absorb large amounts of water or other fluid within its three-dimensional network via hydrogen bonding. For example, synthetic hydrogels can contain over 90% water based on the total weight of the hydrogel.

Synthetic polymers useful to create a cross-linked synthetic hydrogel include, without limitation, a polyacrylamide polymer, a polyvinyl acetate polymer, a polyacrylate polymer, a poly(alkylene oxide) polymer, a polyethylene oxide polymer, a polyethylene glycol polymer, a polyvinyl alcohol polymer, a polylactic acid polymer and an acrylic-modified starch polymer. Such synthetic polymers are made from monomers such as vinyl acetate, acrylamide, alkylene oxide, ethylene glycol and lactic acid. Synthesis of polymers can be precisely controlled and tailored to give a wide range of properties.

The synthetic polymer chains of a synthetic hydrogel are crosslinked (interconnected). The nature of the connections is different for two general classes, physical and chemical. For the former, the connections are weaker and more reversible; for example, heat may break the chain-chain link. Polymer chains of physical synthetic hydrogels are held together by electrostatic forces, hydrogen bonds, hydrophobic interactions or chain entanglements. The polymer chains of chemical synthetic hydrogels are connected by permanent covalent bonds. A covalent bond is characterized by the sharing of pairs of electrons between atoms.

Another way to classify synthetic hydrogels is by the method of preparation. A homopolymer (made from one type of monomer), a copolymer (made from more than one type of monomer), a multipolymer (more than one type of polymer) and an interpenetrating polymer (a second polymer network is polymerized around and within a first polymer network, and there are no covalent linkages between the two networks).

In an embodiment, a ceramic composition disclosed herein comprises a crosslinked synthetic hydrogel. In aspect of this embodiment, a ceramic composition can comprise about 0.1% to about 10% of a crosslinked synthetic hydrogel based on the total dry weight of the composition. In another aspect of this embodiment, a ceramic composition can comprise about 0.25% to about 8% of a crosslinked synthetic hydrogel. In yet another aspect of this embodiment, a ceramic composition can comprise about 0.5% to about 7% of a crosslinked synthetic hydrogel. In still another aspect of this embodiment, a ceramic composition can comprise about 1% to about 6% of a crosslinked synthetic hydrogel. In another aspect of this embodiment, a ceramic composition can comprise about 2% to about 5% of a crosslinked synthetic hydrogel. In yet another aspect of this embodiment, a ceramic composition can comprise about 3% to about 4% of a crosslinked synthetic hydrogel. In still another aspect of this embodiment, a ceramic composition can comprise about 2.5% of a crosslinked synthetic hydrogel.

In another embodiment, a ceramic composition disclosed herein comprises a crosslinked polyacrylamide copolymer hydrogel. In aspect of this embodiment, a ceramic composition can comprise about 0.1% to about 10% of a crosslinked polyacrylamide copolymer hydrogel based on the total dry weight of the composition. In another aspect of this embodiment, a ceramic composition can comprise about 0.25% to about 8% of a crosslinked polyacrylamide copolymer hydrogel. In yet another aspect of this embodiment, a ceramic composition can comprise about 0.5% to about 7% of a crosslinked polyacrylamide copolymer hydrogel. In still another aspect of this embodiment, a ceramic composition can comprise about 1% to about 6% of a crosslinked polyacrylamide copolymer hydrogel. In another aspect of this embodiment, a ceramic composition can comprise about 2% to about 5% of a crosslinked polyacrylamide copolymer hydrogel. In yet another aspect of this embodiment, a ceramic composition can comprise about 3% to about 4% of a crosslinked polyacrylamide copolymer hydrogel. In still another aspect of this embodiment, a ceramic composition can comprise about 2.5% of a crosslinked polyacrylamide copolymer hydrogel.

A ceramic composition disclosed herein comprises a binder. A binder is a substance that provides or promotes adhesion or bonding among the other components comprising the ceramic matrix composition as well as overall plasticity to the ceramic matrix composition. Binders are typically organized by the method of adhesion or bonding. These are then organized into reactive and non-reactive binders, which refers to whether the binder chemically reacts in order to harden. Non-reactive binders include drying binders, pressure-sensitive binders, contact binders and hot binders. Reactive binders include one-part binders and multi-part binders. Synthetic monomer binders include, without limitation, acrylonitrile, cyanoacrylate, acrylic and resorcinol (resorcinol-formaldahyde).

Synthetic polymer binders include, without limitation, epoxy (polyepoxide) resins, epoxy putty, ethylene-vinyl acetate, phenol formaldehyde resin, polyamide, a polyester resin, polyethylene, polypropylene, polysulfides, polyurethane, a polyvinyl ester, polyvinyl acetate (PVA), a polyvinyl alcohol, polyvinyl chloride (PVC), polyvinyl chloride emulsion (PVCE), polyvinylpyrrolidone, rubber cement, silicone and styrene acrylic copolymer.

A ceramic composition disclosed herein comprises a binder. In aspect of this embodiment, a ceramic composition can comprise about 0.1% to about 10% of a binder based on the total dry weight of the composition. In another aspect of this embodiment, a ceramic composition can comprise about 0.25% to about 8% of a binder. In yet another aspect of this embodiment, a ceramic composition can comprise about 0.5% to about 7% of a binder. In still another aspect of this embodiment, a ceramic composition can comprise about 1% to about 6% of a binder. In another aspect of this embodiment, a ceramic composition can comprise about 2% to about 5% of a binder. In yet another aspect of this embodiment, a ceramic composition can comprise about 3% to about 4% of a binder. In still another aspect of this embodiment, a ceramic composition can comprise about 2.5% of a binder.

A ceramic composition disclosed herein may further comprises an antimicrobial. An antimicrobial is an agent that kills microorganisms or inhibits its growth. A microorganisms includes, without limitation, mold, mildew, fungi, yeast, algae, and bacteria. An antimicrobial includes, without limitation, an antiviral agent, antibacterial agent, an antifungal agent, or an antiparasitic agent. An antibacterial agent includes, without limitation, anilides like triclocarban; biguanides like chlorhexidine, alexidene and polymeric buguanides; bisphenols like triclosan and hexachlorophene; halophenols like p-chloro-m-xylenol (PCMX); heavy metals like silver and mercury containing compounds; phenol; cresols; and quaternary ammonium compounds like cetrimide, benzalkonium chloride and cetylpyridinium chloride. An antifungal agent includes, without limitation, metal containing compounds like silver, copper, mercury and zinc containing compounds including metal oxide compounds thereof; isothiazolinones like isothiazolinones having a C1-C8 moiety including methylisothiazolinone, benzylisothiazolinone and octylisothiazolinone and isothiazolin-3-ones including 1,2-benzisothiazolin-3-one, octylisothiazolinone, benzisothiazolinone, 1,2-benzisothiazolin-3-one, 2-methyl-4-isothiazolin-3-one, 2-n-octyl-4-isothiazolin-3-one, 5-chloro-2-methyl-4-isothiazolin-3-one; zinc 1-hydroxy-2(1H)-pyridinethione, and 2-(4-thiazolyl)-benzimidazole, In an embodiment, ceramic composition disclosed herein can further comprise an antimicrobial. In aspect of this embodiment, a ceramic composition can comprise about 0.1% to about 5% of an antimicrobial based on the total dry weight of the composition. In another aspect of this embodiment, a ceramic composition can comprise about 0.25% to about 4% of an antimicrobial. In yet another aspect of this embodiment, a ceramic composition can comprise about 0.5% to about 3% of an antimicrobial. In still another aspect of this embodiment, a ceramic composition can comprise about 0.6% to about 2% of an antimicrobial. In another aspect of this embodiment, a ceramic composition can comprise about 0.7% to about 1.5% of an antimicrobial. In yet another aspect of this embodiment, a ceramic composition can comprise about 0.8% to about 1% of an antimicrobial. In still another aspect of this embodiment, a ceramic composition can comprise about 0.9% of an antimicrobial.

In an embodiment, ceramic composition disclosed herein can further comprise a metal oxide. In aspect of this embodiment, a ceramic composition can comprise a piece of a metal oxide that is inserted into the ceramic composition during manufacture of the ceramic composition. A piece of a metal oxide includes, without limitation, a bar, rod disk pellets or any geometrical piece of metal oxide that can be placed into the ceramic composition without adverse effects to the shape or function of the ceramic composition. In aspect of this embodiment, a ceramic composition can comprise a metal oxide that is added to the ceramic composition as a powder during manufacture of the ceramic composition.

In aspect of this embodiment, a ceramic composition can comprise about 0.1% to about 5% of a metal oxide based on the total dry weight of the composition. In another aspect of this embodiment, a ceramic composition can comprise about 0.25% to about 4% of a metal oxide. In yet another aspect of this embodiment, a ceramic composition can comprise about 0.5% to about 3% of a metal oxide. In still another aspect of this embodiment, a ceramic composition can comprise about 0.6% to about 2% of a metal oxide. In another aspect of this embodiment, a ceramic composition can comprise about 0.7% to about 1.5% of a metal oxide. In yet another aspect of this embodiment, a ceramic composition can comprise about 0.8% to about 1% of a metal oxide. In still another aspect of this embodiment, a ceramic composition can comprise about 0.9% of a metal oxide. A metal oxide includes, without limitation, a silver oxide, a copper oxide, a mercury oxide and a zinc oxide.

In an embodiment, ceramic composition disclosed herein can further comprise zinc or a zinc oxide. In aspect of this embodiment, a ceramic composition can comprise about 0.1% to about 5% of zinc or a zinc oxide based on the total dry weight of the composition. In another aspect of this embodiment, a ceramic composition can comprise about 0.25% to about 4% of zinc or a zinc oxide. In yet another aspect of this embodiment, a ceramic composition can comprise about 0.5% to about 3% of zinc or a zinc oxide. In still another aspect of this embodiment, a ceramic composition can comprise about 0.6% to about 2% of zinc or a zinc oxide. In another aspect of this embodiment, a ceramic composition can comprise about 0.7% to about 1.5% of zinc or a zinc oxide. In yet another aspect of this embodiment, a ceramic composition can comprise about 0.8% to about 1% of zinc or a zinc oxide. In still another aspect of this embodiment, a ceramic composition can comprise about 0.9% of zinc or a zinc oxide.

The present specification also discloses a method of making a ceramic matrix composition. In one embodiment, the disclosed method comprises the step of mixing an appropriate amount of a hydraulic gypsum cement material solution, a non-hydraulic gypsum cement material, a crosslinked synthetic hydrogel solution and a binder with water until a slurry forms. In aspects of this embodiment, a slurry mixture disclosed herein is prepared by mixing about 28% (v/v) to about 48% (v/v) of a 75% hydraulic gypsum cement material solution, about 0.01% (w/v) to about 2% (w/v) of a non-hydraulic gypsum cement material, about 4% (v/v) to about 15% (v/v) of a crosslinked synthetic hydrogel solution, about 0.1% (w/v) to about 5% (w/v) of a binder and about 40% (v/v) to about 62% (v/v) of water until a slurry mixture forms. In other aspects of this embodiment, a slurry mixture disclosed herein is prepared by mixing about 30% (v/v) to about 46% (v/v) of a 75% hydraulic gypsum cement material solution, about 0.025% (w/v) to about 1.5% (w/v) of a non-hydraulic gypsum cement material, about 5% (v/v) to about 14% (v/v) of a crosslinked synthetic hydrogel solution, about 0.2% (w/v) to about 4% (w/v) of a binder and about 42% (v/v) to about 60% (v/v) of water until a slurry mixture forms. In yet other aspects of this embodiment, a slurry mixture disclosed herein is prepared by mixing about 31% (v/v) to about 45% (v/v) of a 75% hydraulic gypsum cement material solution, about 0.05% (w/v) to about 1.0% (w/v) of a non-hydraulic gypsum cement material, about 6% (v/v) to about 13% (v/v) of a 9.5% crosslinked synthetic hydrogel solution, about 0.3% (w/v) to about 3% (w/v) of a binder and about 44% (v/v) to about 58% (v/v) of water until a slurry mixture forms. In still other aspects of this embodiment, a slurry mixture disclosed herein is prepared by mixing about 33% (v/v) to about 43% (v/v) of a 75% hydraulic gypsum cement material solution, about 0.1% (w/v) to about 0.75% (w/v) of a non-hydraulic gypsum cement material, about 7% (v/v) to about 12% (v/v) of a 9.5% crosslinked synthetic hydrogel solution, about 0.4% (w/v) to about 2% (w/v) of a binder and about 46% (v/v) to about 56% (v/v) of water until a slurry mixture forms. In other aspects of this embodiment, a slurry mixture disclosed herein is prepared by mixing about 35% (v/v) to about 41% (v/v) of a 75% hydraulic gypsum cement material solution, about 0.15% (w/v) to about 0.5% (w/v) of a non-hydraulic gypsum cement material, about 8% (v/v) to about 11% (v/v) of a 9.5% crosslinked synthetic hydrogel solution, about 0.5% (w/v) to about 1% (w/v) of a binder and about 48% (v/v) to about 54% (v/v) of water until a slurry mixture forms. In yet other aspects of this embodiment, a slurry mixture disclosed herein is prepared by mixing about 37% (v/v) to about 39% (v/v) of a 75% hydraulic gypsum cement material solution, about 0.2% (w/v) to about 0.4% (w/v) of a non-hydraulic gypsum cement material, about 9% (v/v) to about 10% (v/v) of a 9.5% crosslinked synthetic hydrogel solution, about 0.6% (w/v) to about 0.8% (w/v) of a binder and about 50% (v/v) to about 52% (v/v) of water until a slurry mixture forms. In still other aspects of this embodiment, a slurry mixture disclosed herein is prepared by mixing about 37.9% (v/v) of a 75% hydraulic gypsum cement material solution, about 0.3% (w/v) of a non-hydraulic gypsum cement material, about 9.5% (v/v) of a 9.5% crosslinked synthetic hydrogel solution, about 0.75% (w/v) of a binder and about 51.25% (v/v) of water until a slurry mixture forms.

In another embodiment, the disclosed method comprises the step of mixing an appropriate amount of a hydraulic gypsum cement material solution, a non-hydraulic gypsum cement material, a crosslinked polyacrylamide copolymer hydrogel solution and a polyvinyl acetate with water until a slurry forms. In aspects of this embodiment, a slurry mixture disclosed herein is prepared by mixing about 28% (v/v) to about 48% (v/v) of a 75% hydraulic gypsum cement material solution, about 0.01% (w/v) to about 2% (w/v) of a non-hydraulic gypsum cement material, about 4% (v/v) to about 15% (v/v) of a crosslinked polyacrylamide copolymer hydrogel solution and about 0.1% (w/v) to about 5% (w/v) of a polyvinyl acetate about 40% (v/v) to about 62% (v/v) of water until a slurry mixture forms. In other aspects of this embodiment, a slurry mixture disclosed herein is prepared by mixing about 30% (v/v) to about 46% (v/v) of a 75% hydraulic gypsum cement material solution, about 0.025% (w/v) to about 1.5% (w/v) of a non-hydraulic gypsum cement material, about 5% (v/v) to about 14% (v/v) of a crosslinked polyacrylamide copolymer hydrogel solution, about 0.2% (w/v) to about 4% (w/v) of a polyvinyl acetate and about 42% (v/v) to about 60% (v/v) of water until a slurry mixture forms. In yet other aspects of this embodiment, a slurry mixture disclosed herein is prepared by mixing about 31% (v/v) to about 45% (v/v) of a 75% hydraulic gypsum cement material solution, about 0.05% (w/v) to about 1.0% (w/v) of a non-hydraulic gypsum cement material, about 6% (v/v) to about 13% (v/v) of a 9.5% crosslinked polyacrylamide copolymer hydrogel solution, about 0.3% (w/v) to about 3% (w/v) of a polyvinyl acetate and about 44% (v/v) to about 58% (v/v) of water until a slurry mixture forms. In still other aspects of this embodiment, a slurry mixture disclosed herein is prepared by mixing about 33% (v/v) to about 43% (v/v) of a 75% hydraulic gypsum cement material solution, about 0.1% (w/v) to about 0.75% (w/v) of a non-hydraulic gypsum cement material, about 7% (v/v) to about 12% (v/v) of a 9.5% crosslinked polyacrylamide copolymer hydrogel solution, about 0.4% (w/v) to about 2% (w/v) of a polyvinyl acetate and about 46% (v/v) to about 56% (v/v) of water until a slurry mixture forms. In other aspects of this embodiment, a slurry mixture disclosed herein is prepared by mixing about 35% (v/v) to about 41% (v/v) of a 75% hydraulic gypsum cement material solution, about 0.15% (w/v) to about 0.5% (w/v) of a non-hydraulic gypsum cement material, about 8% (v/v) to about 11% (v/v) of a 9.5% crosslinked polyacrylamide copolymer hydrogel solution, about 0.5% (w/v) to about 1% (w/v) of a polyvinyl acetate and about 48% (v/v) to about 54% (v/v) of water until a slurry mixture forms. In yet other aspects of this embodiment, a slurry mixture disclosed herein is prepared by mixing about 37% (v/v) to about 39% (v/v) of a 75% hydraulic gypsum cement material solution, about 0.2% (w/v) to about 0.4% (w/v) of a non-hydraulic gypsum cement material, about 9% (v/v) to about 10% (v/v) of a 9.5% crosslinked polyacrylamide copolymer hydrogel solution, about 0.6% (w/v) to about 0.8% (w/v) of a polyvinyl acetate and about 50% (v/v) to about 52% (v/v) of water until a slurry mixture forms. In still other aspects of this embodiment, a slurry mixture disclosed herein is prepared by mixing about 37.9% (v/v) of a 75% hydraulic gypsum cement material solution, about 0.3% (w/v) of a non-hydraulic gypsum cement material, about 9.5% (v/v) of a 9.5% crosslinked polyacrylamide copolymer hydrogel solution, about 0.75% (w/v) of a polyvinyl acetate and about 51.25% (v/v) of water until a slurry mixture forms.

In another embodiment, the disclosed method comprises the step of mixing an appropriate amount of a hydraulic gypsum cement material solution, a non-hydraulic gypsum cement material, a crosslinked synthetic hydrogel solution, a binder and an antimicrobial agent with water until a slurry forms. In aspects of this embodiment, a slurry mixture disclosed herein is prepared by mixing about 28% (v/v) to about 48% (v/v) of a 75% hydraulic gypsum cement material solution, about 0.01% (w/v) to about 2% (w/v) of a non-hydraulic gypsum cement material, about 4% (v/v) to about 15% (v/v) of a crosslinked synthetic hydrogel solution, about 0.1% (w/v) to about 5% (w/v) of a binder, about 0.01% (w/v) to about 2% (w/v) of an antimicrobial agent and about 40% (v/v) to about 62% (v/v) of water until a slurry mixture forms. In other aspects of this embodiment, a slurry mixture disclosed herein is prepared by mixing about 30% (v/v) to about 46% (v/v) of a 75% hydraulic gypsum cement material solution, about 0.025% (w/v) to about 1.5% (w/v) of a non-hydraulic gypsum cement material, about 5% (v/v) to about 14% (v/v) of a crosslinked synthetic hydrogel solution, about 0.2% (w/v) to about 4% (w/v) of a binder, about 0.025% (w/v) to about 1.5% (w/v) of an antimicrobial agent and about 42% (v/v) to about 60% (v/v) of water until a slurry mixture forms. In yet other aspects of this embodiment, a slurry mixture disclosed herein is prepared by mixing about 31% (v/v) to about 45% (v/v) of a 75% hydraulic gypsum cement material solution, about 0.05% (w/v) to about 1.0% (w/v) of a non-hydraulic gypsum cement material, about 6% (v/v) to about 13% (v/v) of a 9.5% crosslinked synthetic hydrogel solution, about 0.3% (w/v) to about 3% (w/v) of a binder, about 0.05% (w/v) to about 1.0% (w/v) of an antimicrobial agent and about 44% (v/v) to about 58% (v/v) of water until a slurry mixture forms. In still other aspects of this embodiment, a slurry mixture disclosed herein is prepared by mixing about 33% (v/v) to about 43% (v/v) of a 75% hydraulic gypsum cement material solution, about 0.1% (w/v) to about 0.75% (w/v) of a non-hydraulic gypsum cement material, about 7% (v/v) to about 12% (v/v) of a 9.5% crosslinked synthetic hydrogel solution, about 0.4% (w/v) to about 2% (w/v) of a binder, about 0.1% to about 0.75% (w/v) of an antimicrobial agent and about 46% (v/v) to about 56% (v/v) of water until a slurry mixture forms. In other aspects of this embodiment, a slurry mixture disclosed herein is prepared by mixing about 35% (v/v) to about 41% (v/v) of a 75% hydraulic gypsum cement material solution, about 0.15% (w/v) to about 0.5% (w/v) of a non-hydraulic gypsum cement material, about 8% (v/v) to about 11% (v/v) of a 9.5% crosslinked synthetic hydrogel solution, about 0.5% (w/v) to about 1% (w/v) of a binder, about 0.15% (w/v) to about 0.5% (w/v) of an antimicrobial agent and about 48% (v/v) to about 54% (v/v) of water until a slurry mixture forms. In yet other aspects of this embodiment, a slurry mixture disclosed herein is prepared by mixing about 37% (v/v) to about 39% (v/v) of a 75% hydraulic gypsum cement material solution, about 0.2% (w/v) to about 0.4% (w/v) of a non-hydraulic gypsum cement material, about 9% (v/v) to about 10% (v/v) of a 9.5% crosslinked synthetic hydrogel solution, about 0.6% (w/v) to about 0.8% (w/v) of a binder, about 0.2% to about 0.4% of an antimicrobial agent and about 50% (v/v) to about 52% (v/v) of water until a slurry mixture forms. In still other aspects of this embodiment, a slurry mixture disclosed herein is prepared by mixing about 37.9% (v/v) of a 75% hydraulic gypsum cement material solution, about 0.3% (w/v) of a non-hydraulic gypsum cement material, about 9.5% (v/v) of a 9.5% crosslinked synthetic hydrogel solution, about 0.75% (w/v) of a binder, about 0.3% (w/v) of an antimicrobial agent and about 51.25% (v/v) of water until a slurry mixture forms.

In another embodiment, the disclosed method comprises the step of mixing an appropriate amount of a hydraulic gypsum cement material solution, a non-hydraulic gypsum cement material, a crosslinked polyacrylamide copolymer hydrogel solution, a polyvinyl acetate and a metal oxide with water until a slurry forms. In aspects of this embodiment, a slurry mixture disclosed herein is prepared by mixing about 28% (v/v) to about 48% (v/v) of a 75% hydraulic gypsum cement material solution, about 0.01% (w/v) to about 2% (w/v) of a non-hydraulic gypsum cement material, about 4% (v/v) to about 15% (v/v) of a crosslinked polyacrylamide copolymer hydrogel solution, about 0.1% (w/v) to about 5% (w/v) of a polyvinyl acetate, about 0.01% (w/v) to about 2% (w/v) of a metal oxide and about 40% (v/v) to about 62% (v/v) of water until a slurry mixture forms. In other aspects of this embodiment, a slurry mixture disclosed herein is prepared by mixing about 30% (v/v) to about 46% (v/v) of a 75% hydraulic gypsum cement material solution, about 0.025% (w/v) to about 1.5% (w/v) of a non-hydraulic gypsum cement material, about 5% (v/v) to about 14% (v/v) of a crosslinked polyacrylamide copolymer hydrogel solution, about 0.2% (w/v) to about 4% (w/v) of a polyvinyl acetate, about 0.025% (w/v) to about 1.5% (w/v) of a metal oxide and about 42% (v/v) to about 60% (v/v) of water until a slurry mixture forms. In yet other aspects of this embodiment, a slurry mixture disclosed herein is prepared by mixing about 31% (v/v) to about 45% (v/v) of a 75% hydraulic gypsum cement material solution, about 0.05% (w/v) to about 1.0% (w/v) of a non-hydraulic gypsum cement material, about 6% (v/v) to about 13% (v/v) of a 9.5% crosslinked polyacrylamide copolymer hydrogel solution, about 0.3% (w/v) to about 3% (w/v) of a polyvinyl acetate, about 0.05% (w/v) to about 1.0% (w/v) of a metal oxide and about 44% (v/v) to about 58% (v/v) of water until a slurry mixture forms. In still other aspects of this embodiment, a slurry mixture disclosed herein is prepared by mixing about 33% (v/v) to about 43% (v/v) of a 75% hydraulic gypsum cement material solution, about 0.1% (w/v) to about 0.75% (w/v) of a non-hydraulic gypsum cement material, about 7% (v/v) to about 12% (v/v) of a 9.5% crosslinked polyacrylamide copolymer hydrogel solution, about 0.4% (w/v) to about 2% (w/v) of a polyvinyl acetate, about 0.1% to about 0.75% (w/v) of a metal oxide and about 46% (v/v) to about 56% (v/v) of water until a slurry mixture forms. In other aspects of this embodiment, a slurry mixture disclosed herein is prepared by mixing about 35% (v/v) to about 41% (v/v) of a 75% hydraulic gypsum cement material solution, about 0.15% (w/v) to about 0.5% (w/v) of a non-hydraulic gypsum cement material, about 8% (v/v) to about 11% (v/v) of a 9.5% crosslinked polyacrylamide copolymer hydrogel solution, about 0.5% (w/v) to about 1% (w/v) of a polyvinyl acetate, about 0.15% (w/v) to about 0.5% (w/v) of a metal oxide and about 48% (v/v) to about 54% (v/v) of water until a slurry mixture forms. In yet other aspects of this embodiment, a slurry mixture disclosed herein is prepared by mixing about 37% (v/v) to about 39% (v/v) of a 75% hydraulic gypsum cement material solution, about 0.2% (w/v) to about 0.4% (w/v) of a non-hydraulic gypsum cement material, about 9% (v/v) to about 10% (v/v) of a 9.5% crosslinked polyacrylamide copolymer hydrogel solution, about 0.6% (w/v) to about 0.8% (w/v) of a polyvinyl acetate, about 0.2% to about 0.4% of a metal oxide and about 50% (v/v) to about 52% (v/v) of water until a slurry mixture forms. In still other aspects of this embodiment, a slurry mixture disclosed herein is prepared by mixing about 37.9% (v/v) of a 75% hydraulic gypsum cement material solution, about 0.3% (w/v) of a non-hydraulic gypsum cement material, about 9.5% (v/v) of a 9.5% crosslinked polyacrylamide copolymer hydrogel solution, about 0.75% (w/v) of a polyvinyl acetate, about 0.3% (w/v) of a metal oxide and about 51.25% (v/v) of water until a slurry mixture forms.

In another embodiment, the disclosed method comprises the step of mixing an appropriate amount of a hydraulic gypsum cement material solution, a non-hydraulic gypsum cement material, a crosslinked polyacrylamide copolymer hydrogel solution, a polyvinyl acetate and a zinc or zinc oxide with water until a slurry forms. In aspects of this embodiment, a slurry mixture disclosed herein is prepared by mixing about 28% (v/v) to about 48% (v/v) of a 75% hydraulic gypsum cement material solution, about 0.01% (w/v) to about 2% (w/v) of a non-hydraulic gypsum cement material, about 4% (v/v) to about 15% (v/v) of a crosslinked polyacrylamide copolymer hydrogel solution, about 0.1% (w/v) to about 5% (w/v) of a polyvinyl acetate, about 0.01% (w/v) to about 2% (w/v) of a zinc or zinc oxide and about 40% (v/v) to about 62% (v/v) of water until a slurry mixture forms. In other aspects of this embodiment, a slurry mixture disclosed herein is prepared by mixing about 30% (v/v) to about 46% (v/v) of a 75% hydraulic gypsum cement material solution, about 0.025% (w/v) to about 1.5% (w/v) of a non-hydraulic gypsum cement material, about 5% (v/v) to about 14% (v/v) of a crosslinked polyacrylamide copolymer hydrogel solution, about 0.2% (w/v) to about 4% (w/v) of a polyvinyl acetate, about 0.025% (w/v) to about 1.5% (w/v) of a zinc or zinc oxide and about 42% (v/v) to about 60% (v/v) of water until a slurry mixture forms. In yet other aspects of this embodiment, a slurry mixture disclosed herein is prepared by mixing about 31% (v/v) to about 45% (v/v) of a 75% hydraulic gypsum cement material solution, about 0.05% (w/v) to about 1.0% (w/v) of a non-hydraulic gypsum cement material, about 6% (v/v) to about 13% (v/v) of a 9.5% crosslinked polyacrylamide copolymer hydrogel solution, about 0.3% (w/v) to about 3% (w/v) of a polyvinyl acetate, about 0.05% (w/v) to about 1.0% (w/v) of a zinc or zinc oxide and about 44% (v/v) to about 58% (v/v) of water until a slurry mixture forms. In still other aspects of this embodiment, a slurry mixture disclosed herein is prepared by mixing about 33% (v/v) to about 43% (v/v) of a 75% hydraulic gypsum cement material solution, about 0.1% (w/v) to about 0.75% (w/v) of a non-hydraulic gypsum cement material, about 7% (v/v) to about 12% (v/v) of a 9.5% crosslinked polyacrylamide copolymer hydrogel solution, about 0.4% (w/v) to about 2% (w/v) of a polyvinyl acetate, about 0.1% to about 0.75% (w/v) of a zinc or zinc oxide and about 46% (v/v) to about 56% (v/v) of water until a slurry mixture forms. In other aspects of this embodiment, a slurry mixture disclosed herein is prepared by mixing about 35% (v/v) to about 41% (v/v) of a 75% hydraulic gypsum cement material solution, about 0.15% (w/v) to about 0.5% (w/v) of a non-hydraulic gypsum cement material, about 8% (v/v) to about 11% (v/v) of a 9.5% crosslinked polyacrylamide copolymer hydrogel solution, about 0.5% (w/v) to about 1% (w/v) of a polyvinyl acetate, about 0.15% (w/v) to about 0.5% (w/v) of a zinc or zinc oxide and about 48% (v/v) to about 54% (v/v) of water until a slurry mixture forms. In yet other aspects of this embodiment, a slurry mixture disclosed herein is prepared by mixing about 37% (v/v) to about 39% (v/v) of a 75% hydraulic gypsum cement material solution, about 0.2% (w/v) to about 0.4% (w/v) of a non-hydraulic gypsum cement material, about 9% (v/v) to about 10% (v/v) of a 9.5% crosslinked polyacrylamide copolymer hydrogel solution, about 0.6% (w/v) to about 0.8% (w/v) of a polyvinyl acetate, about 0.2% to about 0.4% of a zinc or zinc oxide and about 50% (v/v) to about 52% (v/v) of water until a slurry mixture forms. In still other aspects of this embodiment, a slurry mixture disclosed herein is prepared by mixing about 37.9% (v/v) of a 75% hydraulic gypsum cement material solution, about 0.3% (w/v) of a non-hydraulic gypsum cement material, about 9.5% (v/v) of a 9.5% crosslinked polyacrylamide copolymer hydrogel solution, about 0.75% (w/v) of a polyvinyl acetate, about 0.3% (w/v) of a zinc or zinc oxide and about 51.25% (v/v) of water until a slurry mixture forms.

In an embodiment, the disclosed method comprises the step of mixing an appropriate amount of a hydraulic gypsum cement material, a non-hydraulic gypsum cement material, a crosslinked synthetic hydrogel and a binder with water until a slurry forms. In aspects of this embodiment, a slurry mixture disclosed herein is prepared by mixing about 22% (w/v) to about 42% (w/v) of a hydraulic gypsum cement material, about 0.01% (w/v) to about 2% (w/v) of a non-hydraulic gypsum cement material, about 0.1% (w/v) to about 5% (w/v) of a crosslinked synthetic hydrogel, about 0.1% (w/v) to about 5% (w/v) of a binder and about 56% (v/v) to about 76% (v/v) of water until a slurry mixture forms. In other aspects of this embodiment, a slurry mixture disclosed herein is prepared by mixing about 24% (w/v) to about 40% (w/v) of a hydraulic gypsum cement material, about 0.025% (w/v) to about 1.5% (w/v) of a non-hydraulic gypsum cement material, about 0.2% (w/v) to about 4% (w/v) of a crosslinked synthetic hydrogel, about 0.2% (w/v) to about 4% (w/v) of a binder and about 58% (v/v) to about 74% (v/v) of water until a slurry mixture forms. In yet other aspects of this embodiment, a slurry mixture disclosed herein is prepared by mixing about 26% (w/v) to about 38% (w/v) of a hydraulic gypsum cement material solution, about 0.05% (w/v) to about 1.0% (w/v) of a non-hydraulic gypsum cement material, about 0.3% (w/v) to about 3% (w/v) of a crosslinked synthetic hydrogel, about 0.3% (w/v) to about 3% (w/v) of a binder and about 60% (v/v) to about 72% (v/v) of water until a slurry mixture forms. In still other aspects of this embodiment, a slurry mixture disclosed herein is prepared by mixing about 28% (w/v) to about 36% (w/v) of a hydraulic gypsum cement material solution, about 0.1% (w/v) to about 0.75% (w/v) of a non-hydraulic gypsum cement material, about 0.4% (w/v) to about 2% (w/v) of a crosslinked synthetic hydrogel, about 0.4% (w/v) to about 2% (w/v) of a binder and about 62% (v/v) to about 70% (v/v) of water until a slurry mixture forms. In other aspects of this embodiment, a slurry mixture disclosed herein is prepared by mixing about 30% (w/v) to about 34% (w/v) of a hydraulic gypsum cement material, about 0.15% (w/v) to about 0.5% (w/v) of a non-hydraulic gypsum cement material, about 0.5% (w/v) to about 1% (w/v) of a crosslinked synthetic hydrogel, about 0.5% (w/v) to about 1% (w/v) of a binder and about 63% (v/v) to about 69% (v/v) of water until a slurry mixture forms. In yet other aspects of this embodiment, a slurry mixture disclosed herein is prepared by mixing about 31% (w/v) to about 33% (w/v) of a hydraulic gypsum cement material solution, about 0.2% (w/v) to about 0.4% (w/v) of a non-hydraulic gypsum cement material, about 0.6% (w/v) to about 0.8% (w/v) of a crosslinked synthetic hydrogel, about 0.6% (w/v) to about 0.8% (w/v) of a binder and about 65% (v/v) to about 67% (v/v) of water until a slurry mixture forms. In still other aspects of this embodiment, a slurry mixture disclosed herein is prepared by mixing about 31.8% (w/v) of a hydraulic gypsum cement material, about 0.3% (w/v) of a non-hydraulic gypsum cement material, about 0.75% (w/v) of a crosslinked synthetic hydrogel, about 0.75% (w/v) of a binder and about 66% (v/v) of water until a slurry mixture forms.

In another embodiment, the disclosed method comprises the step of mixing an appropriate amount of a hydraulic gypsum cement material, a non-hydraulic gypsum cement material, a crosslinked polyacrylamide copolymer hydrogel and a polyvinyl acetate with water until a slurry forms. In aspects of this embodiment, a slurry mixture disclosed herein is prepared by mixing about 22% (w/v) to about 42% (w/v) of a hydraulic gypsum cement material, about 0.01% (w/v) to about 2% (w/v) of a non-hydraulic gypsum cement material, about 0.1% (w/v) to about 5% (w/v) of a crosslinked polyacrylamide copolymer hydrogel, about 0.1% (w/v) to about 5% (w/v) of a polyvinyl acetate and about 56% (v/v) to about 76% (v/v) of water until a slurry mixture forms. In other aspects of this embodiment, a slurry mixture disclosed herein is prepared by mixing about 24% (w/v) to about 40% (w/v) of a hydraulic gypsum cement material, about 0.025% (w/v) to about 1.5% (w/v) of a non-hydraulic gypsum cement material, about 0.2% (w/v) to about 4% (w/v) of a crosslinked polyacrylamide copolymer hydrogel, about 0.2% (w/v) to about 4% (w/v) of a polyvinyl acetate and about 58% (v/v) to about 74% (v/v) of water until a slurry mixture forms. In yet other aspects of this embodiment, a slurry mixture disclosed herein is prepared by mixing about 26% (w/v) to about 38% (w/v) of a hydraulic gypsum cement material solution, about 0.05% (w/v) to about 1.0% (w/v) of a non-hydraulic gypsum cement material, about 0.3% (w/v) to about 3% (w/v) of a crosslinked polyacrylamide copolymer hydrogel, about 0.3% (w/v) to about 3% (w/v) of a polyvinyl acetate and about 60% (v/v)

to about 72% (v/v) of water until a slurry mixture forms. In still other aspects of this embodiment, a slurry mixture disclosed herein is prepared by mixing about 28% (w/v) to about 36% (w/v) of a hydraulic gypsum cement material solution, about 0.1% (w/v) to about 0.75% (w/v) of a non-hydraulic gypsum cement material, about 0.4% (w/v) to about 2% (w/v) of a crosslinked polyacrylamide copolymer hydrogel, about 0.4% (w/v) to about 2% (w/v) of a polyvinyl acetate and about 62% (v/v) to about 70% (v/v) of water until a slurry mixture forms. In other aspects of this embodiment, a slurry mixture disclosed herein is prepared by mixing about 30% (w/v) to about 34% (w/v) of a hydraulic gypsum cement material, about 0.15% (w/v) to about 0.5% (w/v) of a non-hydraulic gypsum cement material, about 0.5% (w/v) to about 1% (w/v) of a crosslinked polyacrylamide copolymer hydrogel, about 0.5% (w/v) to about 1% (w/v) of a polyvinyl acetate and about 63% (v/v) to about 69% (v/v) of water until a slurry mixture forms. In yet other aspects of this embodiment, a slurry mixture disclosed herein is prepared by mixing about 31% (w/v) to about 33% (w/v) of a hydraulic gypsum cement material solution, about 0.2% (w/v) to about 0.4% (w/v) of a non-hydraulic gypsum cement material, about 0.6% (w/v) to about 0.8% (w/v) of a crosslinked polyacrylamide copolymer hydrogel, about 0.6% (w/v) to about 0.8% (w/v) of a polyvinyl acetate and about 65% (v/v) to about 67% (v/v) of water until a slurry mixture forms. In still other aspects of this embodiment, a slurry mixture disclosed herein is prepared by mixing about 31.8% (w/v) of a hydraulic gypsum cement material, about 0.3% (w/v) of a non-hydraulic gypsum cement material, about 0.75% (w/v) of a crosslinked polyacrylamide copolymer hydrogel, about 0.75% (w/v) of a polyvinyl acetate and about 66% (v/v) of water until a slurry mixture forms.

In an embodiment, the disclosed method comprises the step of mixing an appropriate amount of a hydraulic gypsum cement material, a non-hydraulic gypsum cement material, a crosslinked synthetic hydrogel, a binder and an antimicrobial agent with water until a slurry forms. In aspects of this embodiment, a slurry mixture disclosed herein is prepared by mixing about 22% (w/v) to about 42% (w/v) of a hydraulic gypsum cement material, about 0.01% (w/v) to about 2% (w/v) of a non-hydraulic gypsum cement material, about 0.1% (w/v) to about 5% (w/v) of a crosslinked synthetic hydrogel, about 0.1% (w/v) to about 5% (w/v) of a binder, about 0.01% (w/v) to about 2% (w/v) of an antimicrobial agent and about 56% (v/v) to about 76% (v/v) of water until a slurry mixture forms. In other aspects of this embodiment, a slurry mixture disclosed herein is prepared by mixing about 24% (w/v) to about 40% (w/v) of a hydraulic gypsum cement material, about 0.025% (w/v) to about 1.5% (w/v) of a non-hydraulic gypsum cement material, about 0.2% (w/v) to about 4% (w/v) of a crosslinked synthetic hydrogel, about 0.2% (w/v) to about 4% (w/v) of a binder, about 0.025% (w/v) to about 1.5% (w/v) of an antimicrobial agent and about 58% (v/v) to about 74% (v/v) of water until a slurry mixture forms. In yet other aspects of this embodiment, a slurry mixture disclosed herein is prepared by mixing about 26% (w/v) to about 38% (w/v) of a hydraulic gypsum cement material solution, about 0.05% (w/v) to about 1.0% (w/v) of a non-hydraulic gypsum cement material, about 0.3% (w/v) to about 3% (w/v) of a crosslinked synthetic hydrogel, about 0.3% (w/v) to about 3% (w/v) of a binder, about 0.05% (w/v) to about 1% (w/v) of an antimicrobial agent and about 60% (v/v) to about 72% (v/v) of water until a slurry mixture forms. In still other aspects of this embodiment, a slurry mixture disclosed herein is prepared by mixing about 28% (w/v) to about 36% (w/v) of a hydraulic gypsum cement material solution, about 0.1% (w/v) to about 0.75% (w/v) of a non-hydraulic gypsum cement material, about 0.4% (w/v) to about 2% (w/v) of a crosslinked synthetic hydrogel, about 0.4% (w/v) to about 2% (w/v) of a binder, about 0.1% (w/v) to about 0.75% (w/v) of an antimicrobial agent and about 62% (v/v) to about 70% (v/v) of water until a slurry mixture forms. In other aspects of this embodiment, a slurry mixture disclosed herein is prepared by mixing about 30% (w/v) to about 34% (w/v) of a hydraulic gypsum cement material, about 0.15% (w/v) to about 0.5% (w/v) of a non-hydraulic gypsum cement material, about 0.5% (w/v) to about 1% (w/v) of a crosslinked synthetic hydrogel, about 0.5% (w/v) to about 1% (w/v) of a binder, about 0.15% (w/v) to about 0.5% (w/v) of an antimicrobial agent and about 63% (v/v) to about 69% (v/v) of water until a slurry mixture forms. In yet other aspects of this embodiment, a slurry mixture disclosed herein is prepared by mixing about 31% (w/v) to about 33% (w/v) of a hydraulic gypsum cement material solution, about 0.2% (w/v) to about 0.4% (w/v) of a non-hydraulic gypsum cement material, about 0.6% (w/v) to about 0.8% (w/v) of a crosslinked synthetic hydrogel, about 0.6% (w/v) to about 0.8% (w/v) of a binder, about 0.2% (w/v) to about 0.4% (w/v) of an antimicrobial agent and about 65% (v/v) to about 67% (v/v) of water until a slurry mixture forms. In still other aspects of this embodiment, a slurry mixture disclosed herein is prepared by mixing about 31.8% (w/v) of a hydraulic gypsum cement material, about 0.3% (w/v) of a non-hydraulic gypsum cement material, about 0.75% (w/v) of a crosslinked synthetic hydrogel, about 0.75% (w/v) of a binder, about 0.3% (w/v) of an antimicrobial agent and about 66% (v/v) of water until a slurry mixture forms.

In an embodiment, the disclosed method comprises the step of mixing an appropriate amount of a hydraulic gypsum cement material, a non-hydraulic gypsum cement material, a crosslinked polyacrylamide copolymer hydrogel, a polyvinyl acetate and a metal oxide with water until a slurry forms. In aspects of this embodiment, a slurry mixture disclosed herein is prepared by mixing about 22% (w/v) to about 42% (w/v) of a hydraulic gypsum cement material, about 0.01% (w/v) to about 2% (w/v) of a non-hydraulic gypsum cement material, about 0.1% (w/v) to about 5% (w/v) of a crosslinked polyacrylamide copolymer hydrogel, about 0.1% (w/v) to about 5% (w/v) of a polyvinyl acetate, about 0.01% (w/v) to about 2% (w/v) of a metal oxide and about 56% (v/v) to about 76% (v/v) of water until a slurry mixture forms. In other aspects of this embodiment, a slurry mixture disclosed herein is prepared by mixing about 24% (w/v) to about 40% (w/v) of a hydraulic gypsum cement material, about 0.025% (w/v) to about 1.5% (w/v) of a non-hydraulic gypsum cement material, about 0.2% (w/v) to about 4% (w/v) of a crosslinked polyacrylamide copolymer hydrogel, about 0.2% (w/v) to about 4% (w/v) of a polyvinyl acetate, about 0.025% (w/v) to about 1.5% (w/v) of a metal oxide and about 58% (v/v) to about 74% (v/v) of water until a slurry mixture forms. In yet other aspects of this embodiment, a slurry mixture disclosed herein is prepared by mixing about 26% (w/v) to about 38% (w/v) of a hydraulic gypsum cement material solution, about 0.05% (w/v) to about 1.0% (w/v) of a non-hydraulic gypsum cement material, about 0.3% (w/v) to about 3% (w/v) of a crosslinked polyacrylamide copolymer hydrogel, about 0.3% (w/v) to about 3% (w/v) of a polyvinyl acetate, about 0.05% (w/v) to about 1% (w/v) of a metal oxide and about 60% (v/v) to about 72% (v/v) of water until a slurry mixture forms. In still other aspects of this embodiment, a slurry mixture disclosed herein is prepared by mixing about 28% (w/v) to about 36%

(w/v) of a hydraulic gypsum cement material solution, about 0.1% (w/v) to about 0.75% (w/v) of a non-hydraulic gypsum cement material, about 0.4% (w/v) to about 2% (w/v) of a crosslinked polyacrylamide copolymer hydrogel, about 0.4% (w/v) to about 2% (w/v) of a polyvinyl acetate, about 0.1% (w/v) to about 0.75% (w/v) of a metal oxide and about 62% (v/v) to about 70% (v/v) of water until a slurry mixture forms. In other aspects of this embodiment, a slurry mixture disclosed herein is prepared by mixing about 30% (w/v) to about 34% (w/v) of a hydraulic gypsum cement material, about 0.15% (w/v) to about 0.5% (w/v) of a non-hydraulic gypsum cement material, about 0.5% (w/v) to about 1% (w/v) of a crosslinked polyacrylamide copolymer hydrogel, about 0.5% (w/v) to about 1% (w/v) of a polyvinyl acetate, about 0.15% (w/v) to about 0.5% (w/v) of a metal oxide and about 63% (v/v) to about 69% (v/v) of water until a slurry mixture forms. In yet other aspects of this embodiment, a slurry mixture disclosed herein is prepared by mixing about 31% (w/v) to about 33% (w/v) of a hydraulic gypsum cement material solution, about 0.2% (w/v) to about 0.4% (w/v) of a non-hydraulic gypsum cement material, about 0.6% (w/v) to about 0.8% (w/v) of a crosslinked polyacrylamide copolymer hydrogel, about 0.6% (w/v) to about 0.8% (w/v) of a polyvinyl acetate, about 0.2% (w/v) to about 0.4% (w/v) of a metal oxide and about 65% (v/v) to about 67% (v/v) of water until a slurry mixture forms. In still other aspects of this embodiment, a slurry mixture disclosed herein is prepared by mixing about 31.8% (w/v) of a hydraulic gypsum cement material, about 0.3% (w/v) of a non-hydraulic gypsum cement material, about 0.75% (w/v) of a crosslinked polyacrylamide copolymer hydrogel, about 0.75% (w/v) of a polyvinyl acetate, about 0.3% (w/v) of a metal oxide and about 66% (v/v) of water until a slurry mixture forms.

In an embodiment, the disclosed method comprises the step of mixing an appropriate amount of a hydraulic gypsum cement material, a non-hydraulic gypsum cement material, a crosslinked polyacrylamide copolymer hydrogel, a polyvinyl acetate and a zinc or zinc oxide with water until a slurry forms. In aspects of this embodiment, a slurry mixture disclosed herein is prepared by mixing about 22% (w/v) to about 42% (w/v) of a hydraulic gypsum cement material, about 0.01% (w/v) to about 2% (w/v) of a non-hydraulic gypsum cement material, about 0.1% (w/v) to about 5% (w/v) of a crosslinked polyacrylamide copolymer hydrogel, about 0.1% (w/v) to about 5% (w/v) of a polyvinyl acetate, about 0.01% (w/v) to about 2% (w/v) of a zinc or zinc oxide and about 56% (v/v) to about 76% (v/v) of water until a slurry mixture forms. In other aspects of this embodiment, a slurry mixture disclosed herein is prepared by mixing about 24% (w/v) to about 40% (w/v) of a hydraulic gypsum cement material, about 0.025% (w/v) to about 1.5% (w/v) of a non-hydraulic gypsum cement material, about 0.2% (w/v) to about 4% (w/v) of a crosslinked polyacrylamide copolymer hydrogel, about 0.2% (w/v) to about 4% (w/v) of a polyvinyl acetate, about 0.025% (w/v) to about 1.5% (w/v) of a zinc or zinc oxide and about 58% (v/v) to about 74% (v/v) of water until a slurry mixture forms. In yet other aspects of this embodiment, a slurry mixture disclosed herein is prepared by mixing about 26% (w/v) to about 38% (w/v) of a hydraulic gypsum cement material solution, about 0.05% (w/v) to about 1.0% (w/v) of a non-hydraulic gypsum cement material, about 0.3% (w/v) to about 3% (w/v) of a crosslinked polyacrylamide copolymer hydrogel, about 0.3% (w/v) to about 3% (w/v) of a polyvinyl acetate, about 0.05% (w/v) to about 1% (w/v) of a zinc or zinc oxide and about 60% (v/v) to about 72% (v/v) of water until a slurry mixture forms. In still other aspects of this embodiment, a slurry mixture disclosed herein is prepared by mixing about 28% (w/v) to about 36% (w/v) of a hydraulic gypsum cement material solution, about 0.1% (w/v) to about 0.75% (w/v) of a non-hydraulic gypsum cement material, about 0.4% (w/v) to about 2% (w/v) of a crosslinked polyacrylamide copolymer hydrogel, about 0.4% (w/v) to about 2% (w/v) of a polyvinyl acetate, about 0.1% (w/v) to about 0.75% (w/v) of a zinc or zinc oxide and about 62% (v/v) to about 70% (v/v) of water until a slurry mixture forms. In other aspects of this embodiment, a slurry mixture disclosed herein is prepared by mixing about 30% (w/v) to about 34% (w/v) of a hydraulic gypsum cement material, about 0.15% (w/v) to about 0.5% (w/v) of a non-hydraulic gypsum cement material, about 0.5% (w/v) to about 1% (w/v) of a crosslinked polyacrylamide copolymer hydrogel, about 0.5% (w/v) to about 1% (w/v) of a polyvinyl acetate, about 0.15% (w/v) to about 0.5% (w/v) of a zinc or zinc oxide and about 63% (v/v) to about 69% (v/v) of water until a slurry mixture forms. In yet other aspects of this embodiment, a slurry mixture disclosed herein is prepared by mixing about 31% (w/v) to about 33% (w/v) of a hydraulic gypsum cement material solution, about 0.2% (w/v) to about 0.4% (w/v) of a non-hydraulic gypsum cement material, about 0.6% (w/v) to about 0.8% (w/v) of a crosslinked polyacrylamide copolymer hydrogel, about 0.6% (w/v) to about 0.8% (w/v) of a polyvinyl acetate, about 0.2% (w/v) to about 0.4% (w/v) of a zinc or zinc oxide and about 65% (v/v) to about 67% (v/v) of water until a slurry mixture forms. In still other aspects of this embodiment, a slurry mixture disclosed herein is prepared by mixing about 31.8% (w/v) of a hydraulic gypsum cement material, about 0.3% (w/v) of a non-hydraulic gypsum cement material, about 0.75% (w/v) of a crosslinked polyacrylamide copolymer hydrogel, about 0.75% (w/v) of a polyvinyl acetate, about 0.3% (w/v) of a zinc or zinc oxide and about 66% (v/v) of water until a slurry mixture forms.

A coloring agent may optionally be added to the slurry mixture during its preparation or after the slurry mixture is formed. Selection of a coloring agent may be based primarily on aesthetic reasons, such as, e.g., to match a preexisting material, or branding purpose.

In one embodiment, once the slurry mixture is prepared, it can then be deposited into a form or mold where the slurry mixture is allowed to set, harden and dry. No heating is required to set, harden, chemically alter or dry the slurry mixture in order to produce the ceramic matrix composition disclosed herein. As such, the ceramic matrix composition so produced can be said to be self-curing. After the slurry mixture has set to become the ceramic matrix composition, extra portions of ceramic matrix material can be removed from the composition by trimming, sanding or any other finishing procedure needed to finish the ceramic matrix composition into its final form or shape.

Any form or mold shape or geometry may be used to produce the final ceramic matrix composition. The slurry mixture may be deposited into a form or mold using any procedure that ensures that the slurry mixture is deposited in a manner that ensure the proper and correct shape of the ceramic matrix composition is produced. Examples of slurry mixture deposition include, without limitation, poring, casting, pressing, injecting, spraying, or any other suitable process for ensuring that the slurry mixture is deposited properly within the form or mold. Either during and/or after deposition, the form or mold containing the slurry mixture may be subjected to agitation, such as, e.g., ultrasonic agitation or mechanical agitation, in order to facilitate complete deposition of the mixture into the form or mold.

A method disclosed herein may optionally embed other components or materials into the form or mold before or during deposition of the slurry mixture. For example, a wicking fabric may be placed inside the form or mold before, during or after the slurry mixture is deposited into the form or mold. The wicking fabric is useful to provide additional structural shape as well as a wicking function that facilitates the controlled absorption, distribution and evaporation of a fluid as disclosed herein. An example of a wicking fabric is a superabsorbent fabric. As another example, tubing or other such hollow channeled components may be placed inside the form or mold before, during or after the slurry mixture is deposited into the form or mold. As yet another example, a reinforcement or structural components such as wire mess, rebar or other skeletal components may be placed inside the form or mold before, during or after the slurry mixture is deposited into the form or mold.

In one embodiment, once the slurry mixture is prepared, it can then be deposited onto the surface of a pre-existing material where the slurry mixture is allowed to set, harden and dry. No heating is required to set, harden, chemically alter or dry the slurry mixture in order to produce the ceramic matrix composition disclosed herein. As such, the ceramic matrix composition so produced can be said to be self-curing. A pre-existing material includes, without limitation, a roofing material, a housing material, a concrete material, or any other material that is in an environment where the material absorbs moisture at night and releases the moisture by evaporation by day. Non-limiting examples of a roofing material include a clay tile, a concrete tile or a wood tile. Non-limiting examples of a housing material include a brick wall, a stucco wall, a concrete wall or a mason wall. One purpose for such applications is to take the heat load off the pre-existing material.

Aspects of the present specification can also be described as follows:

1. A ceramic matrix composition comprising about 85% to about 99% of a hydraulic gypsum cement material, about 0.1% to about 5% of a non-hydraulic gypsum cement material, about 0.1% to about 10% of a crosslinked synthetic hydrogel, and about 0.1% to about 10% of a binder, wherein the ceramic matrix composition comprises a three-dimensional interconnected array of channels.
2. The ceramic matrix composition according to embodiment 1, wherein the hydraulic gypsum cement material is in an amount of about 88% to about 98%, about 89% to about 97%, about 90% to about 96%, about 91% to about 95%, about 92% to about 94% or about 93% the total dry weight of the composition.
3. The ceramic matrix composition according to embodiment 1 or 2, wherein the non-hydraulic gypsum cement material is in an amount of about 0.25% to about 4%, about 0.5% to about 3%, about 0.6% to about 2%, about 0.7% to about 1.5%, about 0.8% to about 1.0% or about 0.9% the total dry weight of the composition.
4. The ceramic matrix composition according to any one of embodiments 1-3, wherein the crosslinked synthetic hydrogel is in an amount of about 0.25% to about 8%, about 0.5% to about 7%, about 1% to about 6%, about 2% to about 5%, about 3% to about 4% or about 2.5% the total dry weight of the composition.
5. The ceramic matrix composition according to any one of embodiments 1-4, wherein the binder is in an amount of about 0.25% to about 8%, about 0.5% to about 7%, about 1% to about 6%, about 2% to about 5%, about 3% to about 4% or about 2.5% the total dry weight of the composition.
6. The ceramic matrix composition according to any one of embodiments 1-5, wherein the hydraulic gypsum cement material comprises calcium sulfate hemihydrate, a silicon dioxide and a cement.
7. The ceramic matrix composition according to embodiment 6, wherein the calcium sulfate hemihydrate is present in an amount of at least 85%, at least 90% or at least 95%.
8. The ceramic matrix composition according to embodiment 6 or 7, wherein the silicon dioxide is present in an amount of about 0.1% to about 10%, about 0.5% to about 7.5% or about 1% to about 5%.
9. The ceramic matrix composition according to any one of embodiments 6-8, wherein the silicon dioxide is present in an amount of about at most 10%, at most 7.5% or at most 5%.
10. The ceramic matrix composition according to any one of embodiments 6-9, wherein the cement is present in an amount of about 0.1% to about 10%, about 0.5% to about 7.5% or about 1% to about 5%.
11. The ceramic matrix composition according to any one of embodiments 6-10, wherein the cement is present in an amount of about at most 10%, at most 7.5% or at most 5%.
12. The ceramic matrix composition according to any one of embodiments 1-11, wherein the non-hydraulic gypsum cement material comprises calcium sulfate hemihydrate, talc and a low weight carbohydrate.
13. The ceramic matrix composition according to embodiment 12, wherein the calcium sulfate hemihydrate is present in an amount of about 60% to about 90%, about 65% to about 85% or about 70% to about 80%.
14. The ceramic matrix composition according to embodiment 12 or 13, wherein the talc is present in an amount of about 1% to about 25%, about 2.5% to about 20% or about 5% to about 15%.
15. The ceramic matrix composition according to any one of embodiments 12-14, wherein the low weight carbohydrate is a three to nine carbon polyhydroxy aldehyde, ketone, alcohol, or acid having acetal type linkages, a simple derivative thereof or a polymer thereof.
16. The ceramic matrix composition according to any one of embodiments 12-15, wherein the low weight carbohydrate is a dextrin.
17. The ceramic matrix composition according to any one of embodiments 12-16, wherein the low weight carbohydrate is present in an amount of about 1% to about 20%, about 2.5% to about 15% or about 5% to about 10%.
18. The ceramic matrix composition according to any one of embodiments 1-17, wherein the crosslinked synthetic hydrogel comprises a polyacrylamide polymer, a polyvinyl acetate polymer, a polyacrylate polymer, a poly(alkylene oxide) polymer, a polyethylene oxide polymer, a polyethylene glycol polymer, a polyvinyl alcohol polymer, a polylactic acid polymer and an acrylic-modified starch polymer.
19. The ceramic matrix composition according to any one of embodiments 1-18, wherein the crosslinked synthetic hydrogel includes a homopolymer, a copolymer a multipolymer or an interpenetrating polymer.
20. The ceramic matrix composition according to any one of embodiments 1-19, wherein the binder is a reactive binder or a non-reactive binder.

21. The ceramic matrix composition according to any one of embodiments 1-20, wherein the binder is a synthetic monomer binder or a synthetic polymer binder.

22. The ceramic matrix composition according to embodiment 21, wherein the synthetic monomer binder includes an acrylonitrile, a cyanoacrylate, an acrylic or a resorcinol.

23. The ceramic matrix composition according to embodiment 21, wherein the synthetic polymer binder includes epoxy (polyepoxide) resins, epoxy putty, ethylene-vinyl acetate, phenol formaldehyde resin, polyamide, a polyester resin, polyethylene, polypropylene, polysulfides, polyurethane, a polyvinyl ester, polyvinyl acetate (PVA), a polyvinyl alcohol, polyvinyl chloride (PVC), polyvinyl chloride emulsion (PVCE), polyvinylpyrrolidone, rubber cement, silicone or styrene acrylic copolymer.

24. The ceramic matrix composition according to any one of embodiments 1-23, further comprises an antimicrobial.

25. The ceramic matrix composition according to embodiment 24, wherein the antimicrobial is an antiviral agent, antibacterial agent, an antifungal agent, an antiparasitic agent or any combination thereof.

26. The ceramic matrix composition according to embodiment 24 or 25, wherein the antimicrobial is a metal containing compound.

27. The ceramic matrix composition according to embodiment 26, wherein the metal containing compound is a silver-containing compound, a copper-containing compound, a mercury-containing compound or a zinc-containing compound.

28. The ceramic matrix composition according to embodiment 26 or 27, wherein the metal containing compound is a metal oxide.

29. The ceramic matrix composition according to embodiment 28, wherein the metal oxide is a silver oxide, a copper oxide, a mercury oxide or a zinc oxide.

30. The ceramic matrix composition according to any one of embodiments 24-29, wherein the antimicrobial is in an amount of about 0.25% to about 4%, about 0.5% to about 3%, about 0.6% to about 2%, about 0.7% to about 1.5%, about 0.8% to about 1.0% or about 0.9% the total dry weight of the composition.

31. The ceramic matrix composition according to any one of embodiments 1-30, having a porosity sufficient to allow fluid to flow into its three-dimensional interconnected array of channels.

32. The ceramic matrix composition according to any one of embodiments 1-31, having a porosity of at least 10%, at least 15%, at least 20%, at least 25%, at least 30%, at least 35%, at least 40%, at least 45%, at least 50%, at least 55%, at least 60%, at least 65%, at least 70% or at least 75% of the total volume of the ceramic matrix composition or a porosity of at most 10%, at most 15%, at most 20%, at most 25%, at most 30%, at most 35%, at most 40%, at most 45%, at most 50%, at most 55%, at most 60%, at most 65%, at most 70% or at most 75% of the total volume of the ceramic matrix composition or a porosity of about 10% to about 20%, about 10% to about 25%, about 10% to about 30%, about 10% to about 35%, about 10% to about 40%, about 10% to about 45%, about 10% to about 50%, about 10% to about 55%, about 10% to about 60%, about 10% to about 65%, about 10% to about 70%, about 10% to about 75%, about 20% to about 30%, about 20% to about 35%, about 20% to about 40%, about 20% to about 45%, about 20% to about 50%, about 20% to about 55%, about 20% to about 60%, about 20% to about 65%, about 20% to about 70%, about 20% to about 75%, about 30% to about 40%, about 30% to about 45%, about 30% to about 50%, about 30% to about 55%, about 30% to about 60%, about 30% to about 65%, about 30% to about 70%, about 30% to about 75%, about 40% to about 50%, about 40% to about 55%, about 40% to about 60%, about 40% to about 65%, about 40% to about 70%, about 40% to about 75%, about 45% to about 50%, about 45% to about 55%, about 45% to about 60%, about 45% to about 65%, about 45% to about 70%, about 45% to about 75%, about 50% to about 55%, about 50% to about 60%, about 50% to about 65%, about 50% to about 70%, about 50% to about 75%, about 55% to about 60%, about 55% to about 65%, about 55% to about 70%, about 55% to about 75%, about 60% to about 65%, about 60% to about 70%, about 60% to about 75%, about 65% to about 70%, about 65% to about 75% or about 70% to about 75% of the total volume of the ceramic matrix composition.

33. The ceramic matrix composition according to any one of embodiments 1-32, having a controlled absorption of a fluid to a volume that is at least 1 time, at least 2 times, at least 3 times, at least 4 times, at least 5 times, at least 6 times, at least 7 times, at least 8 times, at least 9 times or at least 10 times the weight of the ceramic matrix composition or at most 1 time, at most 2 times, at most 3 times, at most 4 times, at most 5 times, at most 6 times, at most 7 times, at most 8 times, at most 9 times or at most 10 times the weight of the ceramic matrix composition or about 1 time to about 2 times, about 1 time to about 3 times, about 1 time to about 4 times, about 1 time to about 5 times, about 1 time to about 6 times, about 1 time to about 7 times, about 1 time to about 8 times, about 1 time to about 9 times, about 1 time to about 10 times, about 2 times to about 3 times, about 2 times to about 4 times, about 2 times to about 5 times, about 2 times to about 6 times, about 2 times to about 7 times, about 2 times to about 8 times, about 2 times to about 9 times, about 2 times to about 10 times, about 3 times to about 4 times, about 3 times to about 5 times, about 3 times to about 6 times, about 3 times to about 7 times, about 3 times to about 8 times, about 3 times to about 9 times, about 3 times to about 10 times, about 4 times to about 5 times, about 4 times to about 6 times, about 4 times to about 7 times, about 4 times to about 8 times, about 4 times to about 9 times, about 4 times to about 10 times, about 5 times to about 6 times, about 5 times to about 7 times, about 5 times to about 8 times, about 5 times to about 9 times, about 5 times to about 10 times, about 6 times to about 7 times, about 6 times to about 8 times, about 6 times to about 9 times, about 6 times to about 10 times, about 7 times to about 8 times, about 7 times to about 9 times, about 7 times to about 10 times, about 8 times to about 9 times, about 8 times to about 10 times or about 9 times to about 10 times the weight of the ceramic matrix composition.

34. The ceramic matrix composition according to any one of embodiments 1-33, having a controlled distribution of a fluid so that when exposed to a fluid the ceramic matrix composition is at least 65%, at least 70%, at least 75%, at least 80%, at least 85%, at least 90%, at least 95%, at least 97%, at least 98% or at least 99% saturated or at most 65%, at most 70%, at most 75%, at most 80%, at most 85%, at most 90%, at most 95%, at most 97%, at most 98% or at most 99% saturated or about 65% to about 75%, about 65% to about 85%, about 65% to about 95%, about 65% to about 97%, about 65% to about 98%, about 65% to about 99%, about 65% to about 100%, about 75% to about 85%, about 75% to about 95%, about 75% to about 97%, about 75% to about 98%, about 75% to about 99%, about 75% to about 100%, about 80% to about 85%, about 80% to about 95%, about 80% to about 97%, about 80% to about 98%, about 80% to about 99%, about 80% to about 100%, about 85% to about 95%, about 85% to about 97%, about 85% to about 98%, about 85% to about 99%, about 85% to about 100%, about 90% to about 95%, about 90% to about 97%, about 90% to about 98%, about 90% to about 99%, about 90% to about 100%, about 95% to about 97%, about 95% to about 98%, about 95% to about 99% or about 95% to about 100% saturated.

35. The ceramic matrix composition according to any one of embodiments 1-34, having a porosity sufficient for evaporation of a fluid from the composition without the formation of fluid condensation on a surface of the composition.

36. The ceramic matrix composition according to any one of embodiments 1-35, having a controlled evaporation rate of a fluid that is at least 0.001 kg/sec, at least 0.002 kg/sec, at least 0.0025 kg/sec, at least 0.003 kg/sec, at least 0.004 kg/sec, at least 0.005 kg/sec, at least 0.006 kg/sec, at least 0.007 kg/sec, at least 0.0075 kg/sec, at least 0.008 kg/sec, at least 0.009 kg/sec, at least 0.01 kg/sec, at least 0.02 kg/sec, at least 0.025 kg/sec, at least 0.03 kg/sec, at least 0.04 kg/sec, at least 0.05 kg/sec, at least 0.06 kg/sec, at least 0.07 kg/sec, at least 0.075 kg/sec, at least 0.08 kg/sec, at least 0.09 kg/sec, at least 0.1 kg/sec, at least 0.2 kg/sec, at least 0.25 kg/sec, at least 0.3 kg/sec, at least 0.4 kg/sec, at least 0.5 kg/sec, at least 0.6 kg/sec, at least 0.7 kg/sec or at least 0.75 kg/sec or having a controlled evaporation rate of a fluid that is at most 0.001 kg/sec, at most 0.002 kg/sec, at most 0.0025 kg/sec, at most 0.003 kg/sec, at most 0.004 kg/sec, at most 0.005 kg/sec, at most 0.006 kg/sec, at most 0.007 kg/sec, at most 0.0075 kg/sec, at most 0.008 kg/sec, at most 0.009 kg/sec, at most 0.01 kg/sec, at most 0.02 kg/sec, at most 0.025 kg/sec, at most 0.03 kg/sec, at most 0.04 kg/sec, at most 0.05 kg/sec, at most 0.06 kg/sec, at most 0.07 kg/sec, at most 0.075 kg/sec, at most 0.08 kg/sec, at most 0.09 kg/sec, at most 0.1 kg/sec, at most 0.2 kg/sec, at most 0.25 kg/sec, at most 0.3 kg/sec, at most 0.4 kg/sec, at most 0.5 kg/sec, at most 0.6 kg/sec, at most 0.7 kg/sec or at most 0.75 kg/sec or having a controlled evaporation rate of a fluid that is about 0.001 kg/sec to about 0.005 kg/sec, about 0.001 kg/sec to about 0.01 kg/sec, about 0.001 kg/sec to about 0.05 kg/sec, about 0.001 kg/sec to about 0.1 kg/sec, about 0.001 kg/sec to about 0.5 kg/sec, about 0.0025 kg/sec to about 0.005 kg/sec, about 0.0025 kg/sec to about 0.01 kg/sec, about 0.0025 kg/sec to about 0.05 kg/sec, about 0.0025 kg/sec to about 0.1 kg/sec, about 0.0025 kg/sec to about 0.5 kg/sec, about 0.005 kg/sec to about 0.01 kg/sec, about 0.005 kg/sec to about 0.05 kg/sec, about 0.005 kg/sec to about 0.1 kg/sec, about 0.005 kg/sec to about 0.5 kg/sec, about 0.0075 kg/sec to about 0.01 kg/sec, about 0.0075 kg/sec to about 0.05 kg/sec, about 0.0075 kg/sec to about 0.1 kg/sec, about 0.0075 kg/sec to about 0.5 kg/sec, about 0.01 kg/sec to about 0.05 kg/sec, about 0.01 kg/sec to about 0.1 kg/sec, about 0.01 kg/sec to about 0.5 kg/sec, about 0.025 kg/sec to about 0.05 kg/sec, about 0.025 kg/sec to about 0.1 kg/sec, about 0.025 kg/sec to about 0.5 kg/sec, about 0.05 kg/sec to about 0.1 kg/sec, about 0.05 kg/sec to about 0.5 kg/sec or 0.1 kg/sec to about 0.5 kg/sec.

37. The ceramic matrix composition according to any one of embodiments 1-36, having a compressive strength of at least 5,000 psi, at least 6,000 psi, at least 7,000 psi, at least 8,000 psi, at least 9,000 psi, at least 10,000 psi, at least 11,000 psi or at least 12,000 psi or a compressive strength of at most 5,000 psi, at most 6,000 psi, at most 7,000 psi, at most 8,000 psi, at most 9,000 psi, at most 10,000 psi, at most 11,000 psi or at most 12,000 psi or a compressive strength of about 5,000 psi to about 6,000 psi, about 5,000 psi to about 7,000 psi, about 5,000 psi to about 8,000 psi, about 5,000 psi to about 9,000 psi, about 5,000 psi to about 10,000 psi, about 5,000 psi to about 11,000 psi, about 5,000 psi to about 12,000 psi, about 6,000 psi to about 7,000 psi, about 6,000 psi to about 8,000 psi, about 6,000 psi to about 9,000 psi, about 6,000 psi to about 10,000 psi, about 6,000 psi to about 11,000 psi, about 6,000 psi to about 12,000 psi, about 7,000 psi to about 8,000 psi, about 7,000 psi to about 9,000 psi, about 7,000 psi to about 10,000 psi, about 7,000 psi to about 11,000 psi, about 7,000 psi to about 12,000 psi, about 8,000 psi to about 9,000 psi, about 8,000 psi to about 10,000 psi, about 8,000 psi to about 11,000 psi, about 8,000 psi to about 12,000 psi, about 9,000 psi to about 10,000 psi, about 9,000 psi to about 11,000 psi, about 9,000 psi to about 12,000 psi, about 10,000 psi to about 11,000 psi, about 10,000 psi to about 12,000 psi or about 11,000 psi to about 12,000 psi.

38. The ceramic matrix composition according to any one of embodiments 1-37, having an impact strength of at least 700 psi, at least 800 psi, at least 900 psi, at least 1,000 psi, at least 1,100 psi, at least 1,200 psi, at least 1,300 psi, at least 1,400 psi or at least 1,500 psi or an impact strength at most 700 psi, at most 800 psi, at most 900 psi, at most 1,000 psi, at most 1,100 psi, at most 1,200 psi, at most 1,300 psi, at most 1,400 psi or at most 1,500 psi or an impact strength of about 700 psi to about 800 psi, about 700 psi to about 900 psi, about 700 psi to about 1,000 psi, about 700 psi to about 1,100 psi, about 700 psi to about 1,200 psi, about 700 psi to about 1,300 psi, about 700 psi to about 1,400 psi, about 700 psi to about 1,500 psi, about 800 psi to about 900 psi, about 800 psi to about 1,000 psi, about 800 psi to about 1,100 psi, about 800 psi to about 1,200 psi, about 800 psi to about 1,300 psi, about 800 psi to about 1,400 psi, about 800 psi to about 1,500 psi, about 900 psi to about 1,000 psi, about 900 psi to about 1,100 psi, about 900 psi to about 1,200 psi, about 900 psi to about 1,300 psi, about 900 psi to about 1,400 psi, about 900 psi to about 1,500 psi, about 1,000 psi to about 1,100 psi, about 1,000 psi to about 1,200 psi, about 1,000 psi to about 1,300 psi, about 1,000 psi to about 1,400 psi, about 1,000 psi to about 1,500 psi, about 1,100 psi to about 1,200 psi, about 1,100 psi to about 1,300 psi, about 1,100 psi to about 1,400 psi, about 1,100 psi to about 1,500 psi, about 1,200 psi to about 1,300 psi, about 1,200 psi to about 1,400 psi, about 1,200 psi to about 1,500 psi, about 1,300 psi to about 1,400 psi, about 1,300 psi to about 1,500 psi or about 1,400 psi to about 1,500 psi.

39. The ceramic matrix composition according to any one of embodiments 1-38, wherein ceramic matrix composition has about 10% less, about 15% less, about 20% less, about 25% less, about 30% less, about 35% less, about 40% less, about 50% less, about 55% less, about 60% less, about 65% less, about 70% less or about 75% less channel formation on the outer surface of the ceramic matrix composition relative to the interior of the ceramic matrix composition or has at least 10% less, at least 15% less, at least 20% less, at least 25% less, at least 30% less, at least 35% less, at least 40% less, at least 50% less, at least 55% less, at least 60% less, at least 65% less, at least 70% less or at least 75% less channel formation on the outer surface of the ceramic matrix composition relative to the interior of the ceramic matrix composition or has at most 10% less, at most 15% less, at most 20% less, at most 25% less, at most 30% less, at most 35% less, at most 40% less, at most 50% less, at most 55% less, at most 60% less, at most 65% less, at most 70% less or at most 75% less channel formation on the outer surface of the ceramic matrix composition relative to the interior of the ceramic matrix composition has about 10% to about 20% less, about 10% to about 30% less, about 10% to about 40% less, about 10% to about 50% less, about 10% to about 60% less, about 10% to about 70% less, about 10% to about 80% less, about 10% to about 90% less, about 20% to about 30% less, about 20% to about 40% less, about 20% to about 50% less, about 20% to about 60% less, about 20% to about 70% less, about 20% to about 80% less, about 20% to about 90% less, about 30% to about 40% less, about 30% to about 50% less, about 30% to about 60% less, about 30% to about 70% less, about 30% to about 80% less, about 30% to about 90% less, about 40% to about 50% less, about 40% to about 60% less, about 40% to about 70% less, about 40% to about 80% less, about 40% to about 90% less, about 50% to about 60% less, about 50% to about 70% less, about 50% to about 80% less, about 50% to about 90% less, about 60% to about 70% less, about 60% to about 80% less, about 60% to about 90% less, about 70% to about 80% less, about 70% to about 90% less or about 80% to about 90% less channel formation on the outer surface of the ceramic matrix composition relative to the interior of the ceramic matrix composition.

40. The ceramic matrix composition according to embodiment 39, wherein the outer surface has a thickness of about 1 mm, about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm or about 20 mm or has a thickness of at least 1 mm, at least 2 mm, at least 3 mm, at least 4 mm, at least 5 mm, at least 6 mm, at least 7 mm, at least 8 mm, at least 9 mm, at least 10 mm, at least 11 mm, at least 12 mm, at least 13 mm, at least 14 mm, at least 15 mm, at least 16 mm, at least 17 mm, at least 18 mm, at least 19 mm or at least 20 mm or has a thickness of at most 1 mm, at most 2 mm, at most 3 mm, at most 4 mm, at most 5 mm, at most 6 mm, at most 7 mm, at most 8 mm, at most 9 mm, at most 10 mm, at most 11 mm, at most 12 mm, at most 13 mm, at most 14 mm, at most 15 mm, at most 16 mm, at most 17 mm, at most 18 mm, at most 19 mm or at most 20 mm or has a thickness of about 1 mm to about 5 mm, about 1 mm to about 10 mm, about 1 mm to about 15 mm, about 1 mm to about 20 mm, about 1 mm to about 25 mm, about 1 mm to about 30 mm, about 1 mm to about 35 mm, about 1 mm to about 40 mm, about 1 mm to about 45 mm, about 1 mm to about 50 mm, about 5 mm to about 10 mm, about 5 mm to about 15 mm, about 5 mm to about 20 mm, about 5 mm to about 25 mm, about 5 mm to about 30 mm, about 5 mm to about 35 mm, about 5 mm to about 40 mm, about 5 mm to about 45 mm, about 5 mm to about 50 mm, about 10 mm to about 15 mm, about 10 mm to about 20 mm, about 10 mm to about 25 mm, about 10 mm to about 30 mm, about 10 mm to about 35 mm, about 10 mm to about 40 mm, about 10 mm to about 45 mm, about 10 mm to about 50 mm, about 15 mm to about 20 mm, about 15 mm to about 25 mm, about 15 mm to about 30 mm, about 15 mm to about 35 mm, about 15 mm to about 40 mm, about 15 mm to about 45 mm, about 15 mm to about 50 mm, about 20 mm to about 25 mm, about 20 mm to about 30 mm, about 20 mm to about 35 mm, about 20 mm to about 40 mm, about 20 mm to about 45 mm, about 20 mm to about 50 mm, about 25 mm to about 30 mm, about 25 mm to about 35 mm, about 25 mm to about 40 mm, about 25 mm to about 45 mm, about 25 mm to about 50 mm, about 30 mm to about 35 mm, about 30 mm to about 40 mm, about 30 mm to about 45 mm, about 30 mm to about 50 mm, about 35 mm to about 40 mm, about 35 mm to about 45 mm, about 35 mm to about 50 mm, about 40 mm to about 45 mm, about 40 mm to about 50 mm or about 40 mm to about 50 mm.

41. A method of making a ceramic matrix composition, the method comprising depositing a slurry mixture into a form or a mold, the slurry mixture comprising about 22% to about 42% of a hydraulic gypsum cement material, about 0.1% to about 5% of a crosslinked synthetic hydrogel, about 0.01% to about 2% of a non-hydraulic gypsum cement material, about 0.1 to about 5% of a binder and about 56% to about 76% of water; and allowing the slurry mixture to set in order to form the ceramic matrix composition.

42. The method according to embodiment 41, wherein the hydraulic gypsum cement is in an amount of about 24% to about 40%, about 26% to about 38%, about 28% to about 36%, about 30% to about 34%, about 31% to about 33% or about 32% the total wet weight of the slurry mixture.

43. The method according to embodiment 41 or 42, wherein the crosslinked synthetic hydrogel is in an amount of about 0.2% to about 4%, about 0.3% to about 3%, about 0.4% to about 1.5%, about 0.5% to about 1%, about 0.6% to about 0.8% or about 0.75% the total wet weight of the slurry mixture.

44. The method according to any one of embodiments 41-43, wherein the non-hydraulic gypsum cement material is in an amount of about 0.025% to about 1.5%, about 0.05% to about 1%, about 0.1% to about 0.75%, about 0.15% to about 0.5%, about 0.2% to about 0.4% or about 0.3% the total wet weight of the slurry mixture.

45. The method according to any one of embodiments 41-44, wherein the binder is in an amount of about 0.2% to about 4%, about 0.3% to about 3%, about 0.4% to about 1.5%, about 0.5% to about 1%, about 0.6% to about 0.8% or about 0.75% the total wet weight of the slurry mixture.

46. The method according to any one of embodiments 41-45, wherein the water is in an amount of about 58% to about 74%, about 60% to about 72%, about 62% to about 70%, about 63% to about 69%, about 65% to about 67% or about 66% the total wet weight of the slurry mixture.

47. The method according to any one of embodiments 41-46, wherein the crosslinked synthetic hydrogel includes a crosslinked polyacrylamide copolymer hydrogel.

48. The method according to any one of embodiments 41-47, wherein the binder includes a polyvinyl acetate.

49. The method according to any one of embodiments 41-48, wherein the composition further comprises an antimicrobial in an amount of about 0.025% to about 1.5%, about 0.05% to about 1%, about 0.1% to about 0.75%, about 0.15% to about 0.5%, about 0.2% to about 0.4% or about 0.3% the total wet weight of the slurry mixture.

50. The method according to embodiment 49, wherein the antimicrobial is an antiviral agent, antibacterial agent, an antifungal agent, an antiparasitic agent or any combination thereof.

51. The method according to embodiment 49 or 50, wherein the antimicrobial is a metal containing compound.

52. The method according to embodiment 51, wherein the metal containing compound is a silver-containing compound, a copper-containing compound, a mercury-containing compound or a zinc-containing compound.

53. The method according to embodiment 51 or 52, wherein the metal containing compound is a metal oxide.

54. The method according to embodiment 53, wherein the metal oxide is a silver oxide, a copper oxide, a mercury oxide or a zinc oxide.

55. The method according to any one of embodiments 41-54, wherein the form or mold comprises one or more additional components.

56. The method according to embodiment 55, wherein the one or more additional components include a superabsorbent fabric, a piece of metal oxide, a tubing or other hollow-channeled structures or a reinforcement or structural component.

57. A method of making a ceramic matrix composition, the method comprising depositing a slurry mixture into a form or a mold, the slurry mixture comprising about 28% to about 46% of a hydraulic gypsum cement material, about 3% to about 16% of a crosslinked synthetic hydrogel, about 0.01% to about 2% of a non-hydraulic gypsum cement material, about 0.1 to about 5% of a binder and about 42% to about 62% of water; and allowing the slurry mixture to set in order to form the ceramic matrix composition.

58. The method according to embodiment 57, wherein the hydraulic gypsum cement is in an amount of about 30% to about 44%, about 32% to about 42%, about 34% to about 42%, about 36% to about 40%, about 37% to about 39% or about 38% the total wet weight of the slurry mixture.

59. The method according to embodiment 57 or 58, wherein the crosslinked synthetic hydrogel is in an amount of about 4% to about 15%, about 5% to about 14%, about 6% to about 13%, about 7.5% to about 11.5%, about 8.5% to about 10.5% or about 9.5% the total wet weight of the slurry mixture.

60. The method according to any one of embodiments 57-59, wherein the non-hydraulic gypsum cement material is in an amount of about 0.025% to about 1.5%, about 0.05% to about 1%, about 0.1% to about 0.75%, about 0.15% to about 0.5%, about 0.2% to about 0.4% or about 0.3% the total wet weight of the slurry mixture.

61. The method according to any one of embodiments 57-60, wherein the binder is in an amount of about 0.2% to about 4%, about 0.3% to about 3%, about 0.4% to about 1.5%, about 0.5% to about 1%, about 0.6% to about 0.8% or about 0.75% the total wet weight of the slurry mixture.

62. The method according to any one of embodiments 57-61, wherein the water is in an amount of about 44% to about 60%, about 46% to about 58%, about 48% to about 56%, about 50% to about 54%, about 51% to about 53% or about 52% the total wet weight of the slurry mixture.

63. The method according to any one of embodiments 57-62, wherein the crosslinked synthetic hydrogel includes a crosslinked polyacrylamide copolymer hydrogel.

64. The method according to any one of embodiments 57-63, wherein the binder includes a polyvinyl acetate.

65. The method according to any one of embodiments 57-64, wherein the composition further comprises an antimicrobial in an amount of about 0.025% to about 1.5%, about 0.05% to about 1%, about 0.1% to about 0.75%, about 0.15% to about 0.5%, about 0.2% to about 0.4% or about 0.3% the total wet weight of the slurry mixture.

66. The method according to embodiment 65, wherein the antimicrobial is an antiviral agent, antibacterial agent, an antifungal agent, an antiparasitic agent or any combination thereof.

67. The method according to embodiment 65 or 66, wherein the antimicrobial is a metal containing compound.

68. The method according to embodiment 67, wherein the metal containing compound is a silver-containing compound, a copper-containing compound, a mercury-containing compound or a zinc-containing compound.

69. The method according to embodiment 67 or 68, wherein the metal containing compound is a metal oxide.

70. The method according to embodiment 69, wherein the metal oxide is a silver oxide, a copper oxide, a mercury oxide or a zinc oxide.

71. The method according to any one of embodiments 57-70, wherein the form or mold comprises one or more additional components.

72. The method according to embodiment 71, wherein the one or more additional components include a superabsorbent fabric, a piece of metal oxide, a tubing or other hollow-channeled structures or a reinforcement or structural component.

73. A method of treating a surface of a pre-existing material, the method comprising depositing a slurry mixture onto the surface of the pre-existing material, the slurry mixture comprising about 28% to about 46% of a hydraulic gypsum cement material, about 10% to about 26% of a crosslinked synthetic hydrogel, about 0.01% to about 2% of a non-hydraulic gypsum cement material, about 0.1 to about 5% of a binder and about 32% to about 52% of water; and allowing the slurry mixture to set in order to form the ceramic matrix composition.

74. The method according to embodiment 73, wherein the hydraulic gypsum cement is in an amount of about 30% to about 44%, about 32% to about 42%, about 34% to about 42%, about 36% to about 40%, about 37% to about 39% or about 38% the total wet weight of the slurry mixture.

75. The method according to embodiment 73 or 74, wherein the crosslinked synthetic hydrogel is in an amount of about 12% to about 26%, about 14% to about 24%, about 16% to about 22%, about 17% to about 21%, about 18% to about 20% or about 19% the total wet weight of the slurry mixture.

76. The method according to any one of embodiments 73-75, wherein the non-hydraulic gypsum cement material is in an amount of about 0.025% to about 1.5%, about 0.05% to about 1%, about 0.1% to about 0.75%, about 0.15% to about 0.5%, about 0.2% to about 0.4% or about 0.3% the total wet weight of the slurry mixture.

77. The method according to any one of embodiments 73-76, wherein the binder is in an amount of about 0.2% to about 4%, about 0.3% to about 3%, about 0.4% to about 1.5%, about 0.5% to about 1%, about 0.6% to about 0.8% or about 0.75% the total wet weight of the slurry mixture.

78. The method according to any one of embodiments 73-77, wherein the water is in an amount of about 34% to about 50%, about 36% to about 48%, about 38% to about 46%, about 40% to about 44%, about 41% to about 43% or about 42% the total wet weight of the slurry mixture.

79. The method according to any one of embodiments 73-78, wherein the crosslinked synthetic hydrogel includes a crosslinked polyacrylamide copolymer hydrogel.

80. The method according to any one of embodiments 73-79, wherein the binder includes a polyvinyl acetate.

81. The method according to any one of embodiments 73-80, wherein the composition further comprises an antimicrobial in an amount of about 0.025% to about 1.5%, about 0.05% to about 1%, about 0.1% to about 0.75%, about 0.15% to about 0.5%, about 0.2% to about 0.4% or about 0.3% the total wet weight of the slurry mixture.
82. The method according to embodiment 81, wherein the antimicrobial is an antiviral agent, antibacterial agent, an antifungal agent, an antiparasitic agent or any combination thereof.
83. The method according to embodiment 81 or 81, wherein the antimicrobial is a metal containing compound.
84. The method according to embodiment 83, wherein the metal containing compound is a silver-containing compound, a copper-containing compound, a mercury-containing compound or a zinc-containing compound.
85. The method according to embodiment 83 or 84, wherein the metal containing compound is a metal oxide.
86. The method according to embodiment 85, wherein the metal oxide is a silver oxide, a copper oxide, a mercury oxide or a zinc oxide.
87. The method according to any one of embodiments 73-86, wherein the pre-existing material includes a roofing material, a housing material, a concrete material, or any other material that is in an environment where the material absorbs moisture at night and releases the moisture by evaporation by day.
88. The method according to embodiment 87, wherein the roofing material include a clay tile, a concrete tile or a wood tile.
89. The method according to embodiment 87, wherein the housing material include a brick wall, a stucco wall, a concrete wall or a mason wall.

EXAMPLES

The following non-limiting examples are provided for illustrative purposes only in order to facilitate a more complete understanding of representative embodiments now contemplated. These examples should not be construed to limit any of the embodiments described in the present specification, including those pertaining to the ceramic matrix compositions, or methods and uses disclosed herein.

Example 1

Part Made from Ceramic Matrix Composition

A ceramic matrix composition was made by first mixing 3,785 mL of a hydraulic gypsum cement material, 20 mL of a non-hydraulic gypsum cement material, 20 mL of polyvinyl acetate, 20 mL of zinc 20 mL of an antimicrobial agent and 5,189 mL of water to produce a slurry mixture. To this slurry mixture add 946 mL of a cross-linked polyacrylamide copolymer that was pre-engorged in water and continue mixing until all components are properly incorporated. The final percent amounts comprise 37.9% of a hydraulic gypsum cement material, 9.5% of a cross-linked polyacrylamide copolymer, 0.2% of a non-hydraulic gypsum cement material, 0.2% of a polyvinyl acetate, 0.2% zinc, 0.2% an antimicrobial agent and 51.9% water. This slurry mixture was poured into a pre-formed mold. After pouring, this mold in vibrated for a short duration in order to level the slurry mixture and ensure proper gradient of channel formation with more channels on the interior of mixture and less channels on the outer portions of the mixture. Once slurry mixture was cast and leveled, a pre-measured size of a wicking fabric as well as a pre-sized zinc plate covered with an additional pre-sized piece of wicking fabric is placed in the mold. The slurry mixture was then allowed to set at ambient temperature for at least 20 minutes. The mold was then opened and the ceramic matrix composition was removed, finished to remove rough edges and installed in an H-vac unit.

Example 2

Clay Tile Treatment Using Ceramic Matrix Composition

A ceramic matrix composition was made by first mixing 3,785 mL of a hydraulic gypsum cement material, 20 mL of a non-hydraulic gypsum cement material, 20 mL of polyvinyl acetate, 20 mL of zinc 20 mL of an antimicrobial agent and 4,242 mL of water to produce a slurry mixture. To this slurry mixture add 1,892 mL of a cross-linked polyacrylamide copolymer that was pre-engorged in water and continue mixing until all components are properly incorporated. The final percent amounts comprise 37.9% of a hydraulic gypsum cement material, 18.9% of a cross-linked polyacrylamide copolymer, 0.2% of a non-hydraulic gypsum cement material, 0.2% of a polyvinyl acetate, 0.2% zinc, 0.2% an antimicrobial agent and 42.4% water. A coloring agent may then be added to match the color of the clay roof tiles. This slurry mixture is then sprayed onto a surface of the roof tiles and then allowed to set.

Example 3

Stucco Treatment Using Ceramic Matrix Composition

A ceramic matrix composition was made by first mixing 3,785 mL of a hydraulic gypsum cement material, 20 mL of a non-hydraulic gypsum cement material, 20 mL of polyvinyl acetate, 20 mL of zinc 20 mL of an antimicrobial agent and 4,242 mL of water to produce a slurry mixture. To this slurry mixture add 1,892 mL of a cross-linked polyacrylamide copolymer that was pre-engorged in water and continue mixing until all components are properly incorporated. The final percent amounts comprise 37.9% of a hydraulic gypsum cement material, 18.9% of a cross-linked polyacrylamide copolymer, 0.2% of a non-hydraulic gypsum cement material, 0.2% of a polyvinyl acetate, 0.2% zinc, 0.2% an antimicrobial agent and 42.4% water. A coloring agent may then be added to match the color of the stucco. This slurry mixture is then sprayed onto a surface of the stucco and then allowed to set.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular compound, composition, article, apparatus, methodology, protocol, and/or reagent, etc., described herein, unless expressly stated as such. In addition, those of ordinary skill in the art will recognize that certain changes, modifications, permutations, alterations, additions, subtractions and sub-combinations thereof can be made in accordance with the teachings herein without departing from the spirit of the present specification. It is therefore intended that the following appended claims and claims hereafter introduced are interpreted to include all such changes, modifications, permutations, alterations, additions, subtractions and sub-combinations as are within their true spirit and scope.

Certain embodiments of the present invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. For instance, as mass spectrometry instruments can vary slightly in determining the mass of a given analyte, the term "about" in the context of the mass of an ion or the mass/charge ratio of an ion refers to +/−0.50 atomic mass unit. At the very least, and not as an attempt to limit the application of the doctrine of equivalents to the scope of the claims, each numerical indication should at least be construed in light of the number of reported significant digits and by applying ordinary rounding techniques.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators such as "first," "second," "third," etc. for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (and equivalent open-ended transitional phrases thereof like including, containing and having) encompasses all the expressly recited elements, limitations, steps and/or features alone or in combination with unrecited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amended for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (and equivalent open-ended transitional phrases thereof) includes within its meaning, as a limiting case, claimed subject matter specified by the closed-ended transitional phrases "consisting of" or "consisting essentially of." As such embodiments described herein or so claimed with the phrase "comprising" are expressly or inherently unambiguously described, enabled and supported herein for the phrases "consisting essentially of" and "consisting of."

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

Lastly, the terminology used herein is for the purpose of describing particular embodiments only, and is not intended to limit the scope of the present invention, which is defined solely by the claims. Accordingly, the present invention is not limited to that precisely as shown and described.

The invention claimed is:

1. A ceramic matrix composition comprising:
   about 85% to about 99% of a hydraulic gypsum cement material, based on a total dry weight of the composition;
   about 0.1% to about 5% of a non-hydraulic gypsum cement material, based on the total dry weight of the composition;
   about 0.1% to about 10% of a crosslinked synthetic hydrogel, based on the total dry weight of the composition; and
   about 0.1% to about 10% of a binder, based on the total dry weight of the composition; wherein the ceramic matrix composition comprises a three-dimensional interconnected array of channels.

2. The ceramic matrix composition according to claim 1, wherein the hydraulic gypsum cement material comprises calcium sulfate hemihydrate, a silicon dioxide and a cement.

3. The ceramic matrix composition according to claim 2, wherein the calcium sulfate hemihydrate is present in an amount of at least 85%, at least 90% or at least 95%, based on a total dry weight of the hydraulic gypsum cement material.

4. The ceramic matrix composition according to claim 2, wherein the silicon dioxide is present in an amount of about 0.1% to about 10%, about 0.5% to about 7.5% or about 1% to about 5%, based on a total dry weight of the hydraulic gypsum cement material.

5. The ceramic matrix composition according to claim 2, wherein the cement is present in an amount of about 0.1% to about 10%, about 0.5% to about 7.5% or about 1% to about 5%, based on a total dry weight of the hydraulic gypsum cement material.

6. The ceramic matrix composition according to claim 1, wherein the non-hydraulic gypsum cement material comprises calcium sulfate hemihydrate, talc and a low-molecular-weight carbohydrate.

7. The ceramic matrix composition according to claim 6, wherein the calcium sulfate hemihydrate is present in an amount of about 60% to about 90%, about 65% to about 85% or about 70% to about 80%, based on a total dry weight of the non-hydraulic gypsum cement material.

8. The ceramic matrix composition according to claim 6, wherein the talc is present in an amount of about 1% to about 25%, about 2.5% to about 20% or about 5% to about 15%, based on a total dry weight of the non-hydraulic gypsum cement material.

9. The ceramic matrix composition according to claim 6, wherein the low-molecular-weight carbohydrate is present in an amount of about 1% to about 20%, about 2.5% to about 15% or about 5% to about 10%, based on a total dry weight of the non-hydraulic gypsum cement material.

10. The ceramic matrix composition according to claim 1, wherein the crosslinked synthetic hydrogel comprises a polyacrylamide polymer, a polyvinyl acetate polymer, a polyacrylate polymer, a poly(alkylene oxide) polymer, a polyethylene oxide polymer, a polyethylene glycol polymer, a polyvinyl alcohol polymer, a polylactic acid polymer and an acrylic-modified starch polymer.

11. The ceramic matrix composition according to claim 1, further comprising an antimicrobial.

12. The ceramic matrix composition according claim 11, wherein the antimicrobial is in an amount of about 0.25% to about 4%, about 0.5% to about 3%, about 0.6% to about 2%, about 0.7% to about 1.5%, about 0.8% to about 1.0% or about 0.9%, based on the total dry weight of the composition.

13. The ceramic matrix composition according to claim 1, wherein the composition has a porosity sufficient to allow fluid to flow into its three-dimensional interconnected array of channels.

14. The ceramic matrix composition according to claim 1, wherein the composition has a controlled absorption of a fluid to a volume that is at least 1 time, at least 2 times, at least 3 times, at least 4 times, at least 5 times, at least 6 times, at least 7 times, at least 8 times, at least 9 times or at least 10 times the weight of the ceramic matrix composition or at most 1 time, at most 2 times, at most 3 times, at most 4 times, at most 5 times, at most 6 times, at most 7 times, at most 8 times, at most 9 times or at most 10 times the weight of the ceramic matrix composition, or about 1 time to about 2 times, about 1 time to about 3 times, about 1 time to about 4 times, about 1 time to about 5 times, about 1 time to about 6 times, about 1 time to about 7 times, about 1 time to about 8 times, about 1 time to about 9 times, about 1 time to about 10 times, about 2 times to about 3 times, about 2 times to about 4 times, about 2 times to about 5 times, about 2 times to about 6 times, about 2 times to about 7 times, about 2 times to about 8 times, about 2 times to about 9 times, about 2 times to about 10 times, about 3 times to about 4 times, about 3 times to about 5 times, about 3 times to about 6 times, about 3 times to about 7 times, about 3 times to about 8 times, about 3 times to about 9 times, about 3 times to about 10 times, about 4 times to about 5 times, about 4 times to about 6 times, about 4 times to about 7 times, about 4 times to about 8 times, about 4 times to about 9 times, about 4 times to about 10 times, about 5 times to about 6 times, about 5 times to about 7 times, about 5 times to about 8 times, about 5 times to about 9 times, about 5 times to about 10 times, about 6 times to about 7 times, about 6 times to about 8 times, about 6 times to about 9 times, about 6 times to about 10 times, about 7 times to about 8 times, about 7 times to about 9 times, about 7 times to about 10 times, about 8 times to about 9 times, about 8 times to about 10 times or about 9 times to about 10 times the weight of the ceramic matrix composition.

15. The ceramic matrix composition according to claim 1, wherein the composition has a controlled distribution of a fluid so that when exposed to a fluid the ceramic matrix composition is at least 65%, at least 70%, at least 75%, at least 80%, at least 85%, at least 90%, at least 95%, at least 97%, at least 98% or at least 99% saturated, or at most 65%, at most 70%, at most 75%, at most 80%, at most 85%, at most 90%, at most 95%, at most 97%, at most 98% or at most 99% saturated, or about 65% to about 75%, about 65% to about 85%, about 65% to about 95%, about 65% to about 97%, about 65% to about 98%, about 65% to about 99%, about 65% to about 100%, about 75% to about 85%, about 75% to about 95%, about 75% to about 97%, about 75% to about 98%, about 75% to about 99%, about 75% to about 100%, about 80% to about 85%, about 80% to about 95%, about 80% to about 97%, about 80% to about 98%, about 80% to about 99%, about 80% to about 100%, about 85% to about 95%, about 85% to about 97%, about 85% to about 98%, about 85% to about 99%, about 85% to about 100%, about 90% to about 95%, about 90% to about 97%, about 90% to about 98%, about 90% to about 99%, about 90% to about 100%, about 95% to about 97%, about 95% to about 98%, about 95% to about 99% or about 95% to about 100% saturated.

16. The ceramic matrix composition according to claim 1, wherein the composition has a controlled evaporation rate of a fluid that is at least 0.001 kg/sec, at least 0.002 kg/sec, at least 0.0025 kg/sec, at least 0.003 kg/sec, at least 0.004 kg/sec, at least 0.005 kg/sec, at least 0.006 kg/sec, at least 0.007 kg/sec, at least 0.0075 kg/sec, at least 0.008 kg/sec, at least 0.009 kg/sec, at least 0.01 kg/sec, at least 0.02 kg/sec, at least 0.025 kg/sec, at least 0.03 kg/sec, at least 0.04 kg/sec, at least 0.05 kg/sec, at least 0.06 kg/sec, at least 0.07 kg/sec, at least 0.075 kg/sec, at least 0.08 kg/sec, at least 0.09 kg/sec, at least 0.1 kg/sec, at least 0.2 kg/sec, at least 0.25 kg/sec, at least 0.3 kg/sec, at least 0.4 kg/sec, at least 0.5 kg/sec, at least 0.6 kg/sec, at least 0.7 kg/sec or at least 0.75 kg/sec, or having a controlled evaporation rate of a fluid that is at most 0.001 kg/sec, at most 0.002 kg/sec, at most 0.0025 kg/sec, at most 0.003 kg/sec, at most 0.004 kg/sec, at most 0.005 kg/sec, at most 0.006 kg/sec, at most 0.007 kg/sec, at most 0.0075 kg/sec, at most 0.008 kg/sec, at most 0.009 kg/sec, at most 0.01 kg/sec, at most 0.02 kg/sec, at most 0.025 kg/sec, at most 0.03 kg/sec, at most 0.04 kg/sec, at most 0.05 kg/sec, at most 0.06 kg/sec, at most 0.07 kg/sec, at most 0.075 kg/sec, at most 0.08 kg/sec, at most 0.09 kg/sec, at most 0.1 kg/sec, at most 0.2 kg/sec, at most 0.25 kg/sec, at most 0.3 kg/sec, at most 0.4 kg/sec, at most 0.5 kg/sec, at most 0.6 kg/sec, at most 0.7 kg/sec or at most 0.75 kg/sec, or having a controlled evaporation rate of a fluid that is about 0.001 kg/sec to about 0.005 kg/sec, about 0.001 kg/sec to about 0.01 kg/sec, about 0.001 kg/sec to about 0.05 kg/sec, about 0.001 kg/sec to about 0.1 kg/sec, about 0.001 kg/sec to about 0.5 kg/sec, about 0.0025 kg/sec to about 0.005 kg/sec, about 0.0025 kg/sec to about 0.01 kg/sec, about 0.0025 kg/sec to about 0.05 kg/sec, about 0.0025 kg/sec to about 0.1 kg/sec, about 0.0025 kg/sec to about 0.5 kg/sec, about 0.005 kg/sec to about 0.01 kg/sec, about 0.005 kg/sec to about 0.05 kg/sec, about 0.005 kg/sec to about 0.1 kg/sec, about 0.005 kg/sec to about 0.5 kg/sec, about 0.0075 kg/sec to about 0.01 kg/sec, about 0.0075 kg/sec to about 0.05 kg/sec, about 0.0075 kg/sec to about 0.1 kg/sec, about 0.0075 kg/sec to about 0.5 kg/sec, about 0.01 kg/sec to about 0.05 kg/sec, about 0.01 kg/sec to about 0.1 kg/sec, about 0.01 kg/sec to about 0.5 kg/sec, about 0.025 kg/sec to about 0.05 kg/sec, about 0.025 kg/sec to about 0.1 kg/sec, about 0.025 kg/sec to about 0.5 kg/sec, about 0.05 kg/sec to about 0.1 kg/sec, about 0.05 kg/sec to about 0.5 kg/sec or about 0.1 kg/sec to about 0.5 kg/sec.

17. A method of making a ceramic matrix composition, the method comprising the steps of:
depositing a slurry mixture into a form or a mold, the slurry mixture comprising about 28% to about 46% by volume of a hydraulic gypsum cement material, about 3% to about 16% by volume of a crosslinked synthetic hydrogel, about 0.01% to about 2% by weight/volume of a non-hydraulic gypsum cement material, about 0.1 to about 5% by weight/volume of a binder, and about 42% to about 62% by volume of water; and
allowing the slurry mixture to set in order to form the ceramic matrix composition.

18. The method according to claim 17, wherein the composition further comprises an antimicrobial in an amount of about 0.025% to about 1.5%, about 0.05% to about 1%, about 0.1% to about 0.75%, about 0.15% to about 0.5%, about 0.2% to about 0.4% or about 0.3%, based on a total wet weight of the slurry mixture.

19. The method according to claim 18, wherein the form or mold comprises one or more additional components, the one or more additional components including a superabsorbent fabric, a piece of metal oxide, a tubing or other hollow-channeled structure or a reinforcement or structural component.

20. A method of treating a surface of a pre-existing material with a ceramic matrix composition, the method comprising the steps of:
depositing a slurry mixture onto the surface of the pre-existing material, the slurry mixture comprising about 28% to about 46% by volume of a hydraulic gypsum cement material, about 10% to about 26% by volume of a crosslinked synthetic hydrogel, about 0.01% to about 2% by weight/volume of a non-hydraulic gypsum cement material, about 0.1 to about 5% by weight/volume of a binder, and about 32% to about 52% by volume of water; and
allowing the slurry mixture to set in order to form the ceramic matrix composition.

* * * * *